United States Patent
Kim et al.

(10) Patent No.: US 10,524,231 B2
(45) Date of Patent: Dec. 31, 2019

(54) METHOD FOR MANAGING NAV IN WIRELESS LAN SYSTEM AND DEVICE FOR SAME

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 15/508,076

(22) PCT Filed: May 20, 2016

(86) PCT No.: PCT/KR2016/005341
§ 371 (c)(1),
(2) Date: Mar. 1, 2017

(87) PCT Pub. No.: WO2016/186469
PCT Pub. Date: Nov. 24, 2016

(65) Prior Publication Data
US 2017/0295560 A1    Oct. 12, 2017

Related U.S. Application Data

(60) Provisional application No. 62/276,244, filed on Jan. 8, 2016, provisional application No. 62/252,501, filed (Continued)

(51) Int. Cl.
*H04W 72/02* (2009.01)
*H04W 84/12* (2009.01)
(Continued)

(52) U.S. Cl.
CPC .......... *H04W 72/02* (2013.01); *H04L 5/0055* (2013.01); *H04W 72/0446* (2013.01); (Continued)

(58) Field of Classification Search
CPC . H04W 72/02; H04W 72/0446; H04W 84/12; H04W 5/001; H04W 74/085; (Continued)

(56) References Cited

U.S. PATENT DOCUMENTS 7,136,361 B2 * 11/2006 Benveniste ............ H04L 47/14
370/310.2
7,164,671 B2 *  1/2007 del Prado ............ H04W 16/14
370/338
(Continued)

FOREIGN PATENT DOCUMENTS

KR  1020140113599   9/2014
KR  1020140130119  11/2014
(Continued)

OTHER PUBLICATIONS

PCT International Application No. PCT/KR2016/005341, Notification of Transmittal of the International Search Report and the Written Opinion of the International Searching Authority, or Declaration dated Aug. 26, 2016, 10 pages.
(Continued)

*Primary Examiner* — Habte Mered
*Assistant Examiner* — Nevena Zecevic Sandhu
(74) *Attorney, Agent, or Firm* — Lee Hong Degerman Kang Waimey

(57) ABSTRACT

According to an embodiment of the present invention, a method of managing a network allocation vector (NAV) by a station (STA) in a wireless LAN system supporting a high efficiency physical layer protocol data unit (HE PPDU) includes: receiving a frame including duration information;
(Continued)

selecting a predetermined NAV from a plurality of NAVs of the STA; and managing the predetermined NAV based on the duration information of the frame, wherein the predetermined NAV is selected based on whether the frame has been received from a basic service set (BSS) to which the STA belongs.

10 Claims, 32 Drawing Sheets

Related U.S. Application Data on Nov. 8, 2015, provisional application No. 62/250,517, filed on Nov. 4, 2015, provisional application No. 62/246,639, filed on Oct. 27, 2015, provisional application No. 62/246,149, filed on Oct. 26, 2015, provisional application No. 62/244,123, filed on Oct. 20, 2015, provisional application No. 62/238,716, filed on Oct. 8, 2015, provisional application No. 62/217,795, filed on Sep. 11, 2015, provisional application No. 62/201,591, filed on Aug. 6, 2015, provisional application No. 62/173,376, filed on Jun. 10, 2015, provisional application No. 62/163,984, filed on May 20, 2015.

(51) Int. Cl.
  *H04L 5/00* (2006.01)
  *H04W 72/04* (2009.01)
  *H04W 74/08* (2009.01)

(52) U.S. Cl.
  CPC ......... *H04W 74/085* (2013.01); *H04W 84/12* (2013.01); *H04L 5/001* (2013.01)

(58) Field of Classification Search
  CPC . H04W 72/04; H04W 74/0816; H04W 74/04; H04W 72/0433; H04W 74/06; H04W 28/26; H04W 74/0808; H04W 28/06; H04W 76/021; H04L 5/0055; H04L 5/001
  See application file for complete search history.

(56) References Cited

U.S. PATENT DOCUMENTS

| | | | |
|---|---|---|---|
| 2005/0135284 A1* | 6/2005 | Nanda | H04L 29/06068 370/294 |
| 2007/0037548 A1* | 2/2007 | Sammour | H04W 52/0235 455/343.2 |
| 2013/0051256 A1* | 2/2013 | Ong | H04W 72/042 370/252 |
| 2014/0029499 A1* | 1/2014 | Chu | H04W 52/0206 370/311 |
| 2014/0341128 A1* | 11/2014 | Turtinen | H04W 28/18 370/329 |
| 2016/0081100 A1* | 3/2016 | Du | H04W 52/04 370/329 |
| 2016/0330757 A1* | 11/2016 | Cherian | H04W 72/1268 |
| 2017/0289987 A1* | 10/2017 | Seok | H04W 74/00 |
| 2018/0084580 A1* | 3/2018 | Anepu | H04W 28/06 |

FOREIGN PATENT DOCUMENTS

| | | |
|---|---|---|
| KR | 1020150003764 | 1/2015 |
| KR | 1020150008470 | 1/2015 |
| WO | 2015016684 | 2/2015 |
| WO | 2015050311 | 4/2015 |

OTHER PUBLICATIONS

European Patent Office Application Serial No. 16796796.7, Search Report dated Jan. 2, 2019, 12 pages.
Sherman, M., "A New Approach to the NAV", doc.: IEEE 802.11-01/372r0, XP017693118, Jun. 2001, 18 pages.
Benveniste, M., "Multiple NAV Protection—Revisited", doc.: IEEE 802.11-04/1093r4, XP017690162, Jan. 2005, 13 pages.
Del Prado, J. et al., "Problems with IEEE 802.11(e) NAV Operation and ONAV Proposal", doc.: IEEE 802.11-01/272a, XP017693198, Jun. 2001, 33 pages.
Khorov, E. et al., "Multiple NAVs for Spatial Reuse", doc.: IEEE 802.11-15/1348, XP068099326, Nov. 2015, 11 pages.

\* cited by examiner

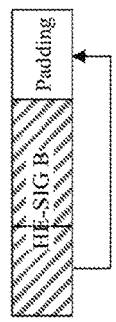
FIG. 18

METHOD FOR MANAGING NAV IN WIRELESS LAN SYSTEM AND DEVICE FOR SAME

CROSS-REFERENCE TO RELATED APPLICATIONS

This application is the National Stage filing under 35 U.S.C. 371 of International Application No. PCT/KR2016/005341, filed on May 20, 2016, which claims the benefit of U.S. Provisional Application No. 62/163,984, filed on May 20, 2015, 62/173,376, filed on Jun. 10, 2015, 62/201,591, filed on Aug. 6, 2015, 62/217,795, filed on Sep. 11, 2015, 62/238,716, filed on Oct. 8, 2015, 62/244,123, filed on Oct. 20, 2015, 62/246,149, filed on Oct. 26, 2015, 62/246,639, filed on Oct. 27, 2015, 62/250,517, filed on Nov. 4, 2015, 62/252,501, filed on Nov. 8, 2015 and 62/276,244, filed on Jan. 8, 2016, the contents of which are all hereby incorporated by reference herein in their entirety.

TECHNICAL FIELD

The present invention relates to a method and apparatus for managing a network allocation vector (NAV) in a wireless LAN system and, more particularly, to a method of managing a NAV on the basis of a received frame and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention devised to solve the problem lies in a method and apparatus for managing a NAV in consideration of a BSS that has transmitted a frame in a wireless LAN system supporting an HE PPDU.

The present invention is not limited to the above technical problems and other technical objects may be inferred from embodiments of the present invention.

Technical Solution

In an aspect of the present invention, a method of managing a network allocation vector (NAV) by a station (STA) in a wireless LAN system supporting a high efficiency physical layer protocol data unit (HE PPDU) includes: receiving a frame including duration information; selecting a predetermined NAV from a plurality of NAVs of the STA; and managing the predetermined NAV on the basis of the duration information of the frame, wherein the predetermined NAV is selected on the basis of whether the frame has been received from a basic service set (BSS) to which the STA belongs.

In another aspect of the present invention, a station (STA) managing a NAV in a wireless LAN system supporting an HE PPDU includes: a receiver for receiving a frame including duration information; and a processor for selecting a predetermined NAV from a plurality of NAVs of the STA and managing the predetermined NAV on the basis of the duration information of the frame, wherein the predetermined NAV is selected on the basis of whether the frame has been received from a basic service set (BSS) to which the STA belongs.

The STA may select a first NAV upon determining that the frame has been received from the BSS to which the STA belongs and select a second NAV upon determining that the frame has been received from a BSS to which the STA does not belong. The STA may select the second NAV when the STA cannot determine a BSS from which the frame has been received.

The plurality of NAVs may include an intra BSS NAV and a non-intra BSS NAV, and the non-intra BSS NAV may be for an OBSS (other BSS) frame. The non-intra BSS NAV may be for a frame through which a BSS cannot be identified. The frame through which a BSS cannot be identified may be an ACK (acknowledgement) frame or a CTS (clear-to-send) frame.

The STA may defer channel access when any of the plurality of NAVs has a value greater than 0.

The STA may set a plurality of NAV timers corresponding to the plurality of NAVs.

The plurality of NAVs may be managed through a difference value between the NAVs and a single NAV timer.

The difference value between the NAVs may be updated when a value of the single NAV timer changes from a first NAV to a second NAV from among the plurality of NAVs.

The STA may check validity of the second NAV using the difference between the NAVs and a current value of the first NAV mapped to the single NAV timer.

Advantageous Effects

According to an embodiment of the present invention, NAVs can be managed correctly and efficiently because STAs consider a BSS that has transmitted a frame when managing a plurality of NAVs in a wireless LAN system supporting an HE PPDU.

Other technical effects in addition to the above-described effects may be inferred from embodiments of the present invention.

DESCRIPTION OF DRAWINGS

FIGS. 17 and 18 illustrating an HE-SIG B padding method.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
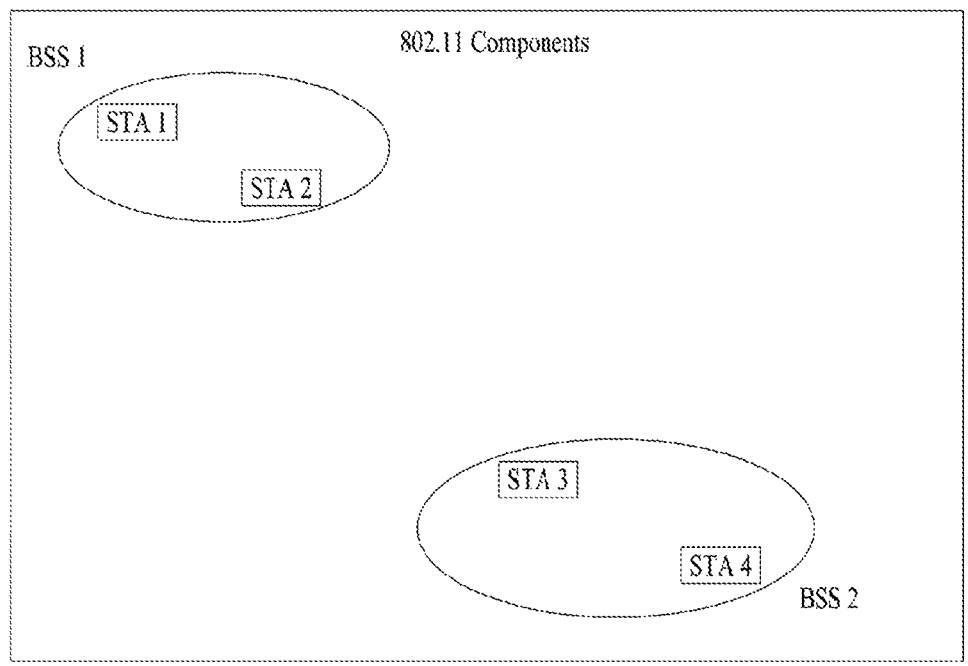
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
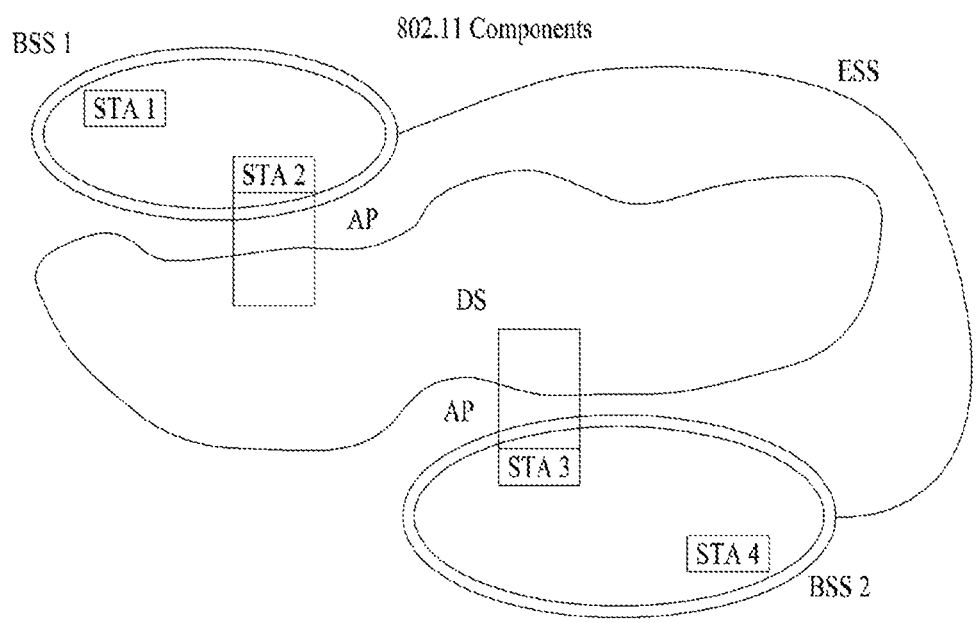
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
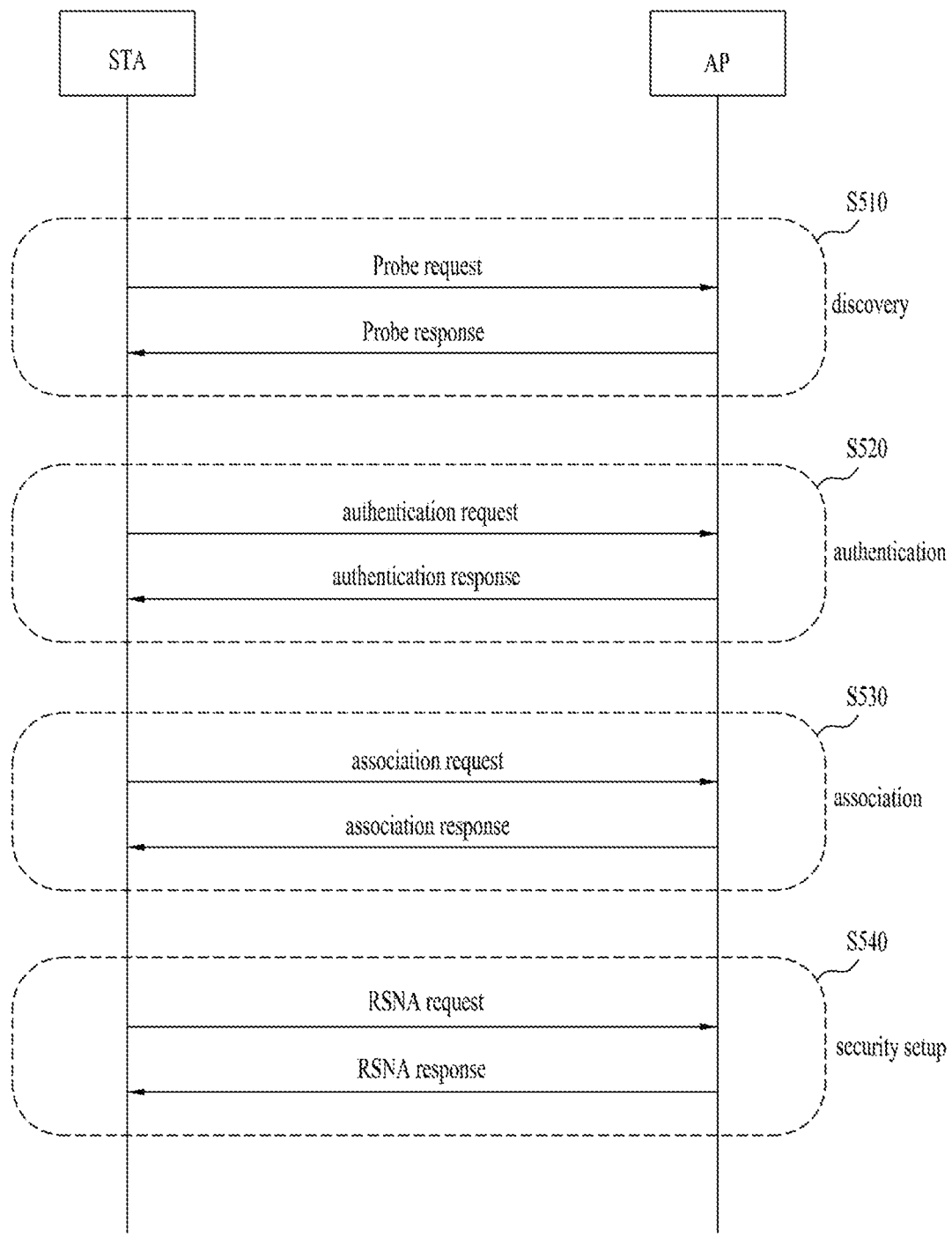
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/ response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
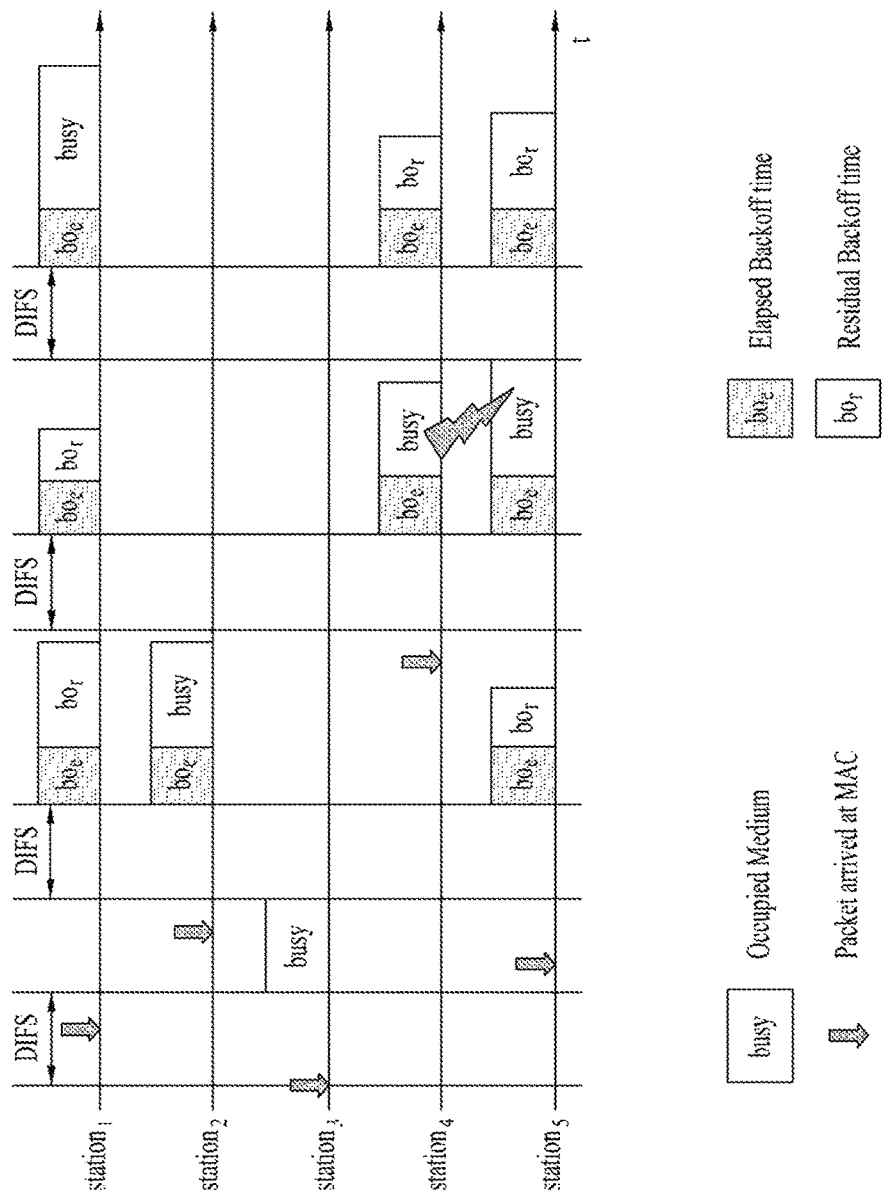
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
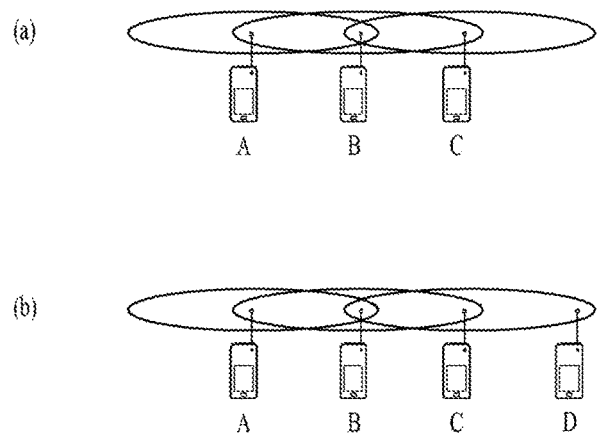
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
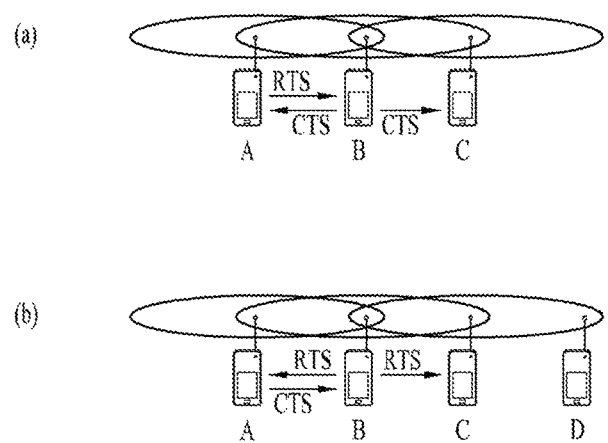
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
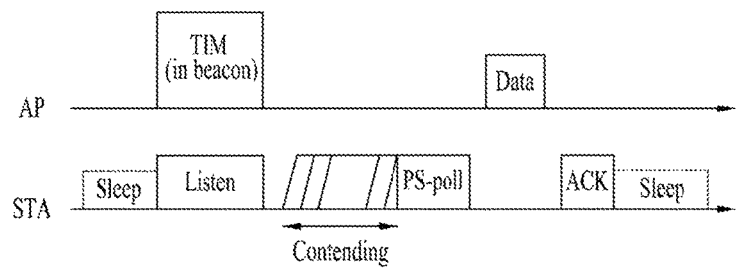
FIGS. 7 to 9 are explanatory diagrams of operation of an STA that has received TIM.
Figure 8:
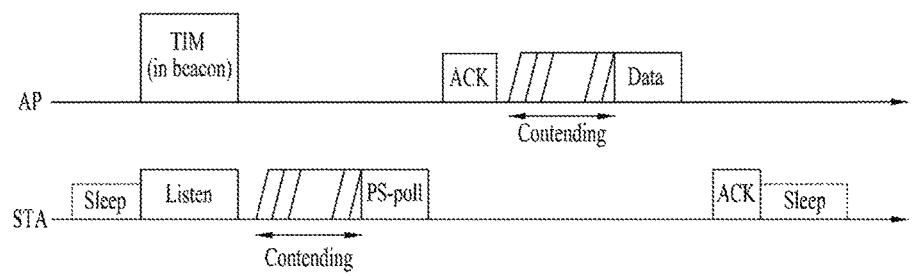
Figure 9:
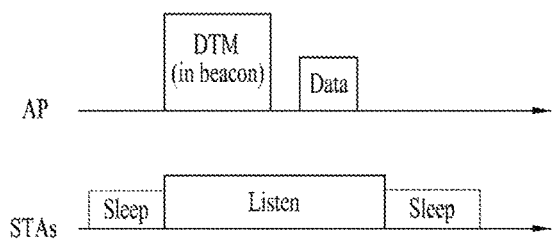

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
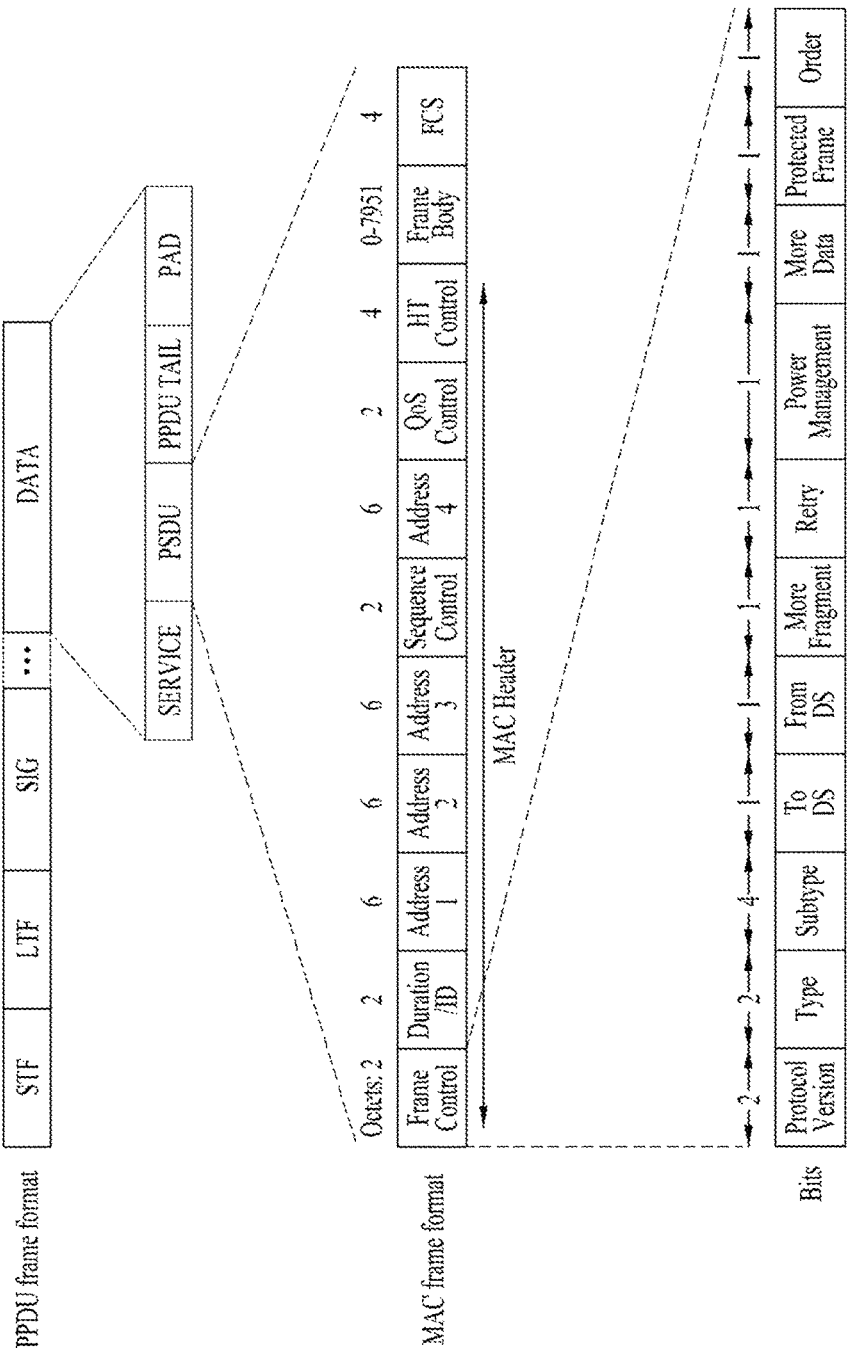
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (is). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
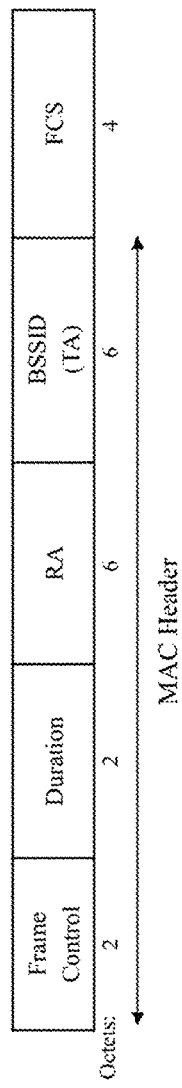
FIG. 11 illustrates a contention free (CF)-END frame.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

A description will be given of examples of an HE PPDU (High Efficiency Physical layer Protocol Data Unit) format in a wireless LAN system supporting 11ax.

Figure 12:
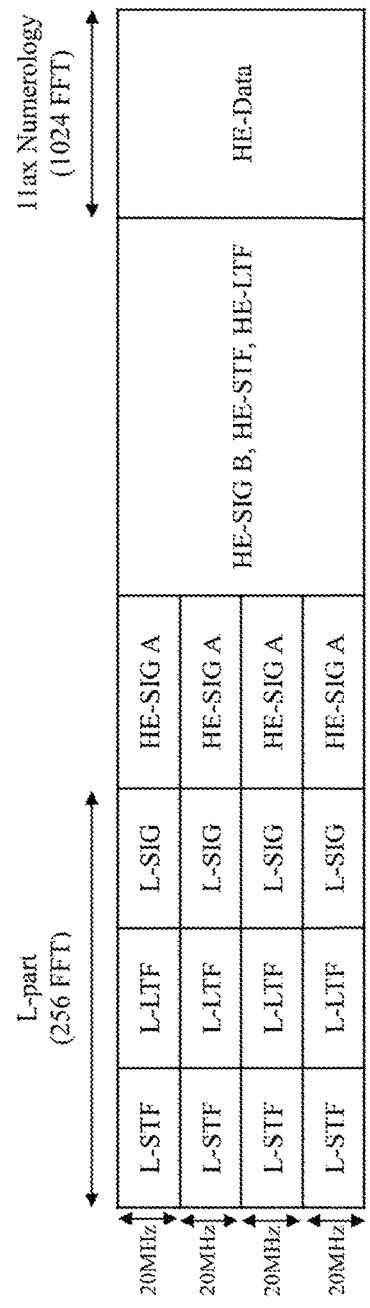
FIG. 12 illustrates an example of an HE PPDU.

FIG. 12 illustrates an example of the HE PPDU. Referring to FIG. 12, an HE-SIG A (or HE-SIG1) field follows an L-Part (e.g., L-STF, L-LTF, L-SIG) and is duplicated every 20 MHz like the L-Part. The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

Figure 13:
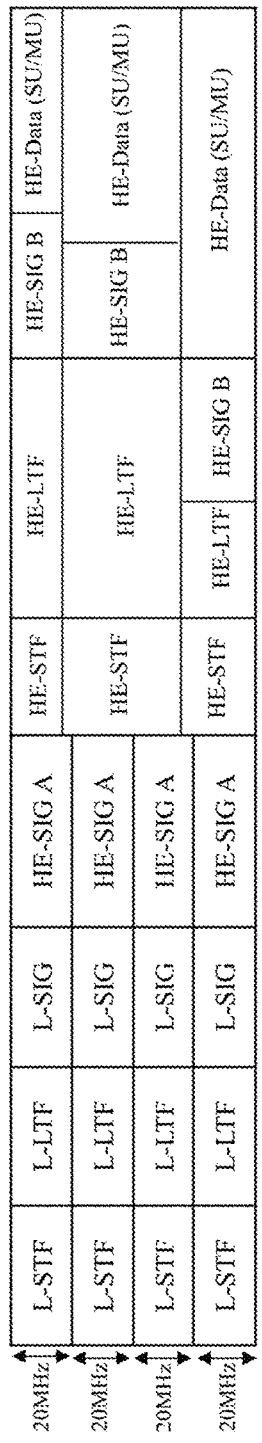
FIG. 13 illustrates another example of the HE PPDU.

FIG. 13 illustrates another example of the HE PPDU. Referring to FIG. 13, the HE-SIG A may include user allocation information, for example, at least one of an STA ID such as a PAID or a GID, allocated resource information and the number of streams (Nsts), in addition to the common control information. Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
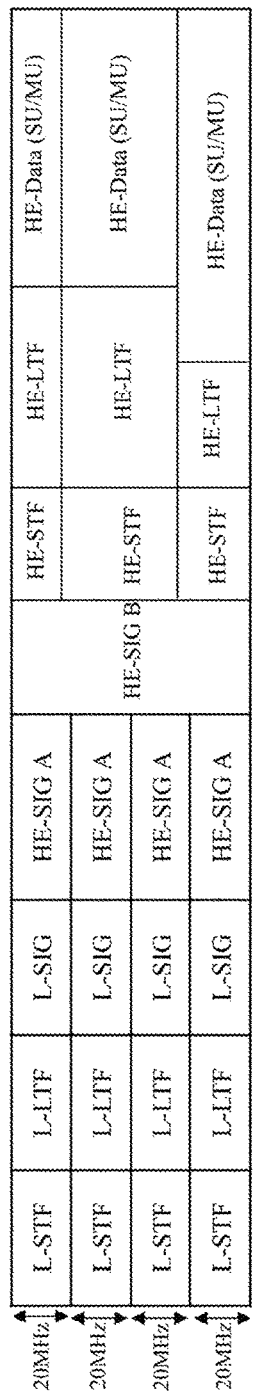
FIG. 14 illustrates another example of the HE PPDU.

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
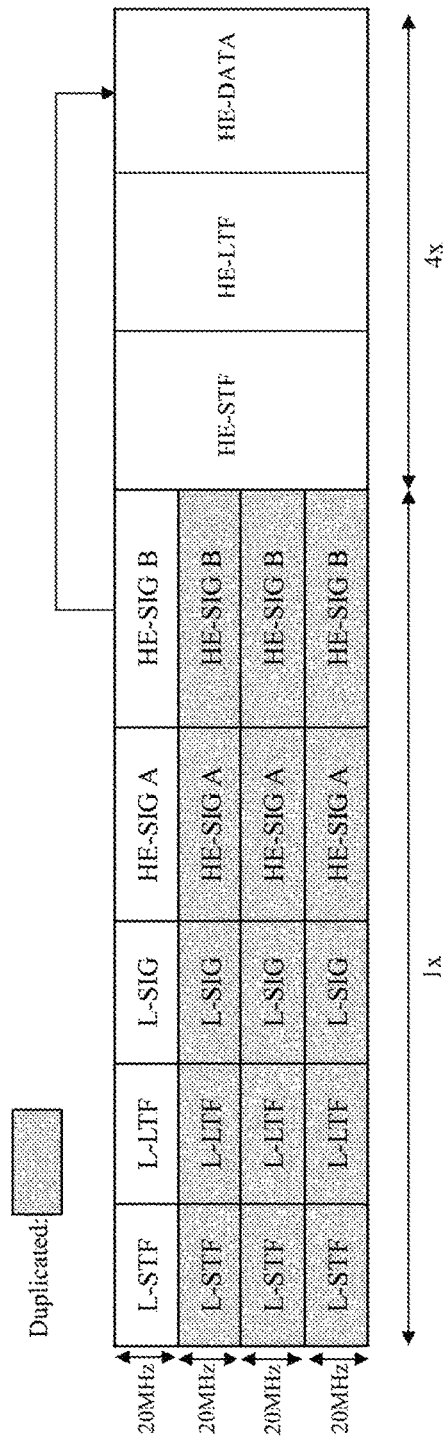
FIG. 15 illustrates another example of the HE PPDU.

FIG. 15 illustrates another example of the HE PPDU. The HE-SIG B may be duplicated per predetermined unit channel. Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
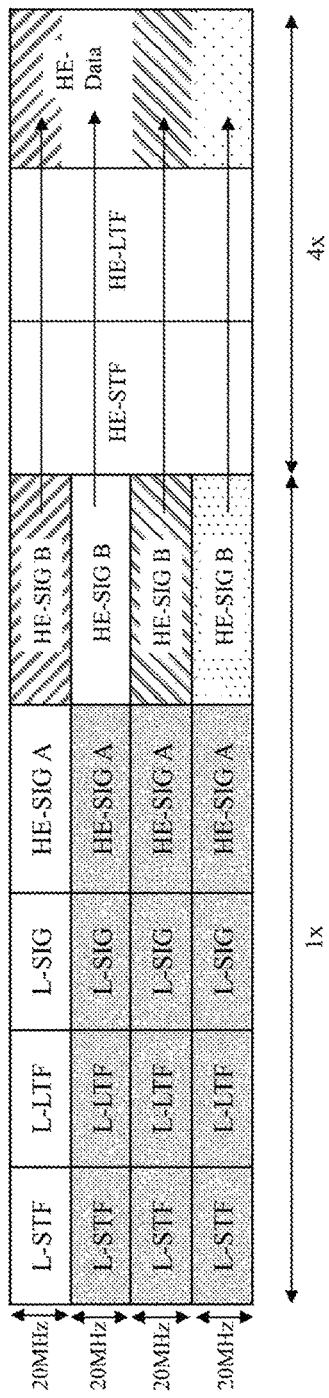
FIG. 16 illustrates another example of the HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
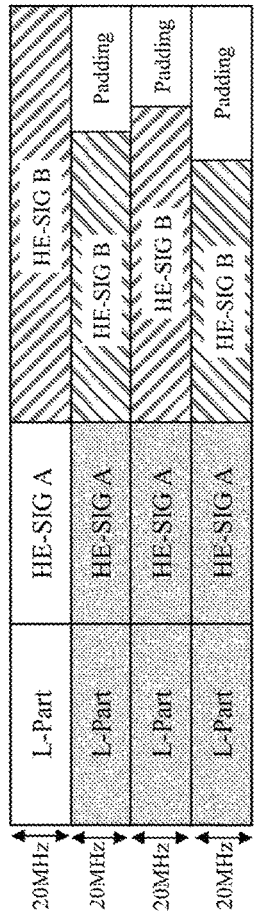

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information for all STAs designated to receive PPDUs in a corresponding bandwidth. The common field may include resource unit (RU) allocation information. All the HE-SIG Bs [1] may have the same content and All the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
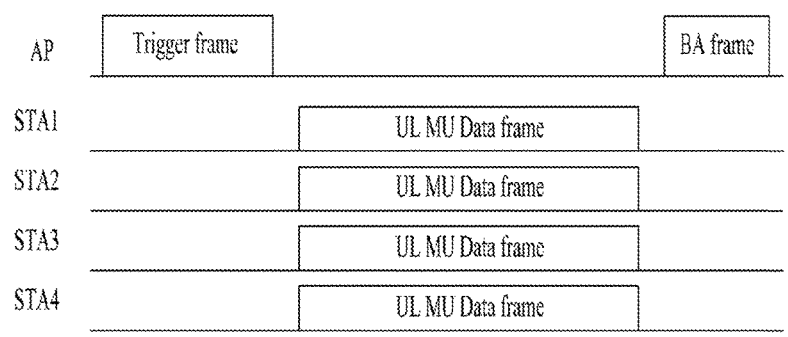
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 20:
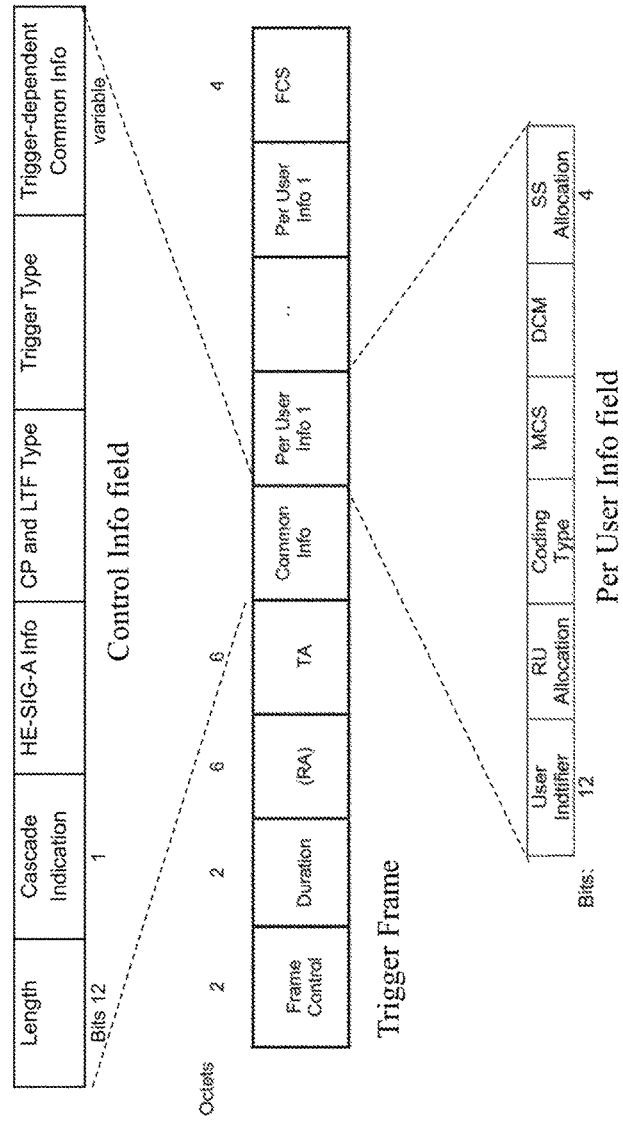
FIG. 20 illustrates a trigger frame format according to an embodiment of the present invention.

FIG. 20 illustrates a trigger frame format according to an embodiment.

Referring to FIG. 20, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 21:
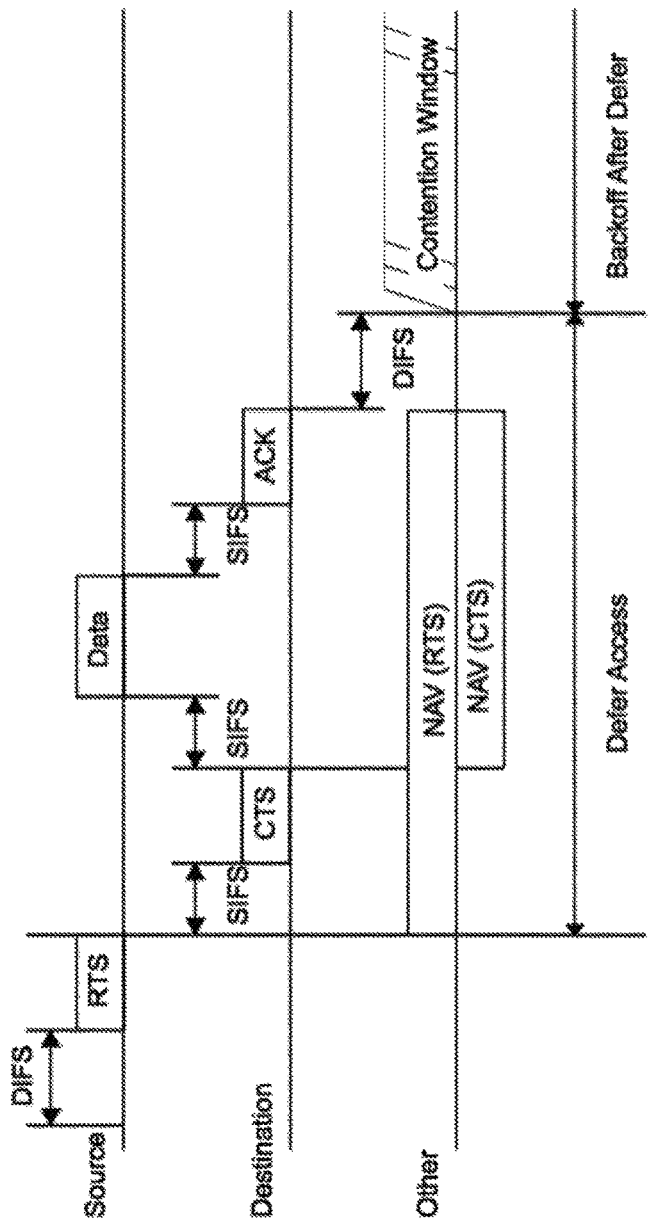
FIG. 21 illustrates an example of NAV setting.

FIG. 21 illustrates an example of NAV setting.

Referring to FIG. 21, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND-.indication primitive for which MAC corresponds to the RTS frame is received), STAs which have set or updated NAVs through the RTS frame can reset the NAVs (e.g., 0). The predetermined period may be (2*aSIFSTime+CTS_Time+aRxPHYStartDelay+2*aSlotTime). The CTS_Time may be calculated on the basis of the CTS frame length indicated by the RTS frame and a data rate.

Although FIG. 21 illustrates setting or update of a NAV through the RTS frame or CTS frame for convenience, NAV setting/resetting/update may be performed on the basis of duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

TXOP (Transmission Opportunity) Truncation

Figure 22:
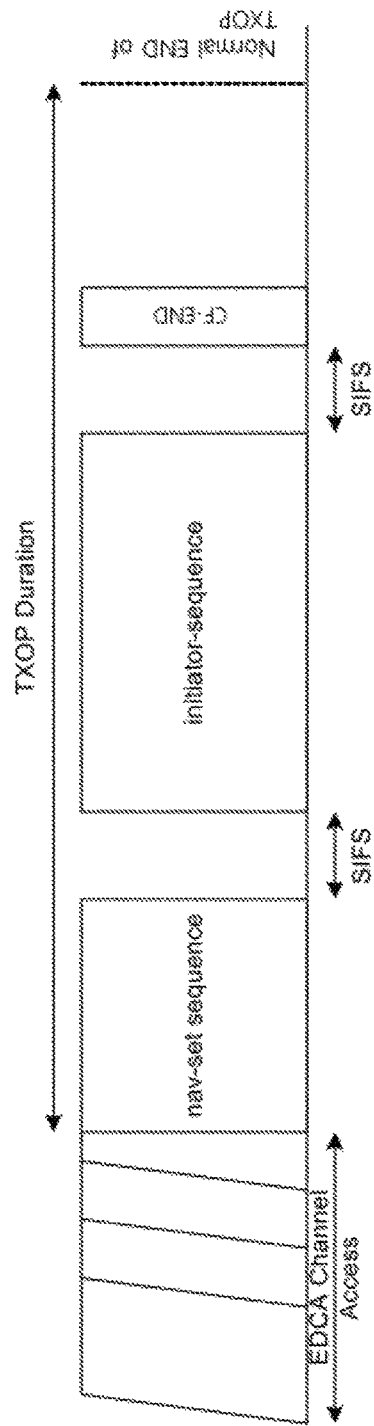
FIG. 22 illustrates an example of TXOP truncation.

FIG. 22 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 22, an STA that has accessed a medium transmits a sequence (e.g., RTS/CTS) for NAV setting.

After SIFS, a TXOP holder (or TXOP initiator) and a TXOP responder transmit and receive PPDUs (e.g., initiator sequence). The TXOP holder truncates a TXOP by transmitting a CF-END frame when there is no data to be transmitted within the TXOP.

STAs which have received the CF-END frame reset NAVS thereof and can start contending for medium access without delay.

As described above, a TXOP duration is set through the duration field of the MAC header in the current wireless LAN system. That is, a TXOP holder (e.g., Tx STA) and a TXOP responder (e.g., Rx STA) include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and sets/updates NAVs to defer use of channels until NAV periods.

In an 11ax system supporting the HE PPDU, the third party STAs cannot decode an MPDU included in a UL MU PPDU even when they receive the UL MU PPDU if the UL MU PPDU does not include the HE-SIG B. If the third party STAs cannot decode the MPDU, the third party STAs cannot acquire TXOP duration information (e.g., duration field) included in the MAC header of the MPDU. Accordingly, it is difficult to correctly perform NAV setting/update.

Even when an HE PPDU frame including the HE-SIG B is received, if the HE-SIG B structure is encoded per STA and is designed such that a STA can read only HE-SIG B content allocated to that STA, the third party STAs cannot decode a MAC frame (e.g., an MPDU in the HE PPDU corresponding to other STAS) transmitted and received by other STAs. Accordingly, the third party STAs cannot acquire TXOP information in this case.

TXOP Duration Indication Through HE-SIG A

To solve the aforementioned problem, a method through which an STA includes TXOP duration information in the HE-SIG A and transmits the HE-SIG A is proposed. As described above, 15 bits (e.g., B0 to B14) of the duration field of the MAC header may indicate duration information of up to 32.7 ms (0 to 32767 us). When the 15-bit duration information included in the duration field of the MAC header is included in the HE-SIG A and transmitted, an 11ax third party STA can correctly set/update a NAV. However, HE-SIG A signaling overhead excessively increases. While 15 bits in an MPDU for payload transmission can be regarded as a relatively small size in the MAC layer, the HE-SIG A for common control information transmission in the physical layer is a compactly designed field, and thus an increase of 15 bits in the HE-SIG A corresponds to relatively large signaling overhead.

Accordingly, an embodiment of the present invention proposes an efficient TXOP duration indication method for minimizing HE-SIG A overhead. In addition, an embodiment of the present invention proposes frame transmission and reception operations based on a TXOP duration newly defined in the HE-SIG A. Hereinafter, the duration field included in the MAC header may be referred to as a MAC duration for convenience.

While it is assumed that TXOP duration information is included in the HE SIG A and transmitted in the following description, the scope of the present invention is not limited thereto and the TXOP duration information may be transmitted through other parts (e.g., L-SIG, HE-SIG B, HE-SIG C, . . . , and part of A-MPDU or MPDU). For example, when a TXOP duration is transmitted through the HE-SIG B, the TXOP duration can be transmitted through common information (e.g., common part) of the HE-SIG B or a SIG B contents part (e.g., Per user Info) transmitted at the first (or end) part of the HE-SIG B.

A description will be given of a TXOP duration structure in an HE SIG field and examples indicating the TXOP duration. A value set to the NAV of a third party STA can be interpreted as a TXOP duration for a TXOP holder/responder. For example, a duration field value is a TXOP for frame transmission and reception in view of the TXOP holder/responder. However, the duration field value refers to a NAV value in view of the third party STA. Accordingly, a NAV setting/update operation of the third party STA may be referred to as a TXOP setting/update operation because the NAV setting/update operation sets a NAV corresponding to a TXOP for the TXOP holder/responder. Furthermore, the term "TXOP duration" may be simply referred to as "duration" or "TXOP". The TXOP duration may be used to indicate a field (e.g., the TXOP duration field of the HE-SIG A) in a frame or to indicate an actual TXOP duration value.

Indices assigned to examples described below are for convenience of description and thus examples having different indices may be combined to embody one invention or respective examples may embody respective inventions.

Example 1 of TXOP Duration

The TXOP duration may be set to $2^N-1$ (or $2^N$). It is assumed that the TXOP duration is set to $2^N-1$ for convenience. The value N can be transmitted in the TXOP duration field of the HE-SIG A.

For example, when N is 4 bits, N has a value in the range of 0 to 15. Accordingly, the TXOP duration indicated through N having a size of 4 bits may have a value in the range of 0 to 32,767 µs. When the TXOP duration is set to indicate a maximum of 5 ms, only N=0 to 13 may be used to indicate the TXOP duration and N=14 and N=15 may be used for other purposes.

This example is one of methods for indicating the TXOP duration through $X*2^Y-1$ (e.g., X=1), X and/or Y may be changed in various manners. In addition, values X and Y may be transmitted through the HE-SIG A field.

Example 2 of TXOP Duration

According to an embodiment of the present invention, the TXOP duration may be set to $X^Y-1$ (or $X^Y$). It is assumed that the TXOP duration is set to $X^Y-1$. AN STA can transmit values X and Y through the TXOP duration field (e.g., in the HE-SIG A).

If the TXOP duration field transmitted in the HE-SIG A is K bits, n bits (first n bits) of the K bits may indicate the value X and m bits thereof (e.g., m bits at the end) may indicate the value Y. The n bits may be n MSBs or n LSBs and the m bits may be m LSBs or m MSBs. The values K, m and n can be set in various manners.

(i) For example, it is assumed that K=6, n=3 and m=3. When X□{2~9} and Y□{0~7}, the TXOP duration may have a value in the range of 0 to 4,782,968 µs.

(ii) In another example, it is assumed that K=5, n=2 and m=3. When X□{2~5} and Y□{0~7}, the TXOP duration may have a value in the range of 0 to 78,124 µs. If X□{2, 3, 5, 6} and Y□{0~7}, the TXOP duration may have a value in the range of 0 to 78,124 µs.

(iii) In another example, it is assumed that K=4, n=1 and m=3. When X□{2, 3}(or X□{5, 6}) and Y□{0~7}, the TXOP duration may have a value in the range of 0 to 279,963 µs.

If a maximum of P ms (e.g., 5 ms) is indicated through the TXOP duration field (e.g., in the HE-SIG A), an (X, Y) combination that minimizes $X^Y-1$, from among (X, Y) combinations satisfying $X^Y-1 \geq P$ ms (e.g., 5 ms), may be used to indicate a maximum TXOP duration value and other (X, Y) combinations may not be used.

This example is one of methods of indicating the TXOP duration through $Z*X^Y-1$ and thus X, Y and/or Z may be changed in various manners.

Example 3 of TXOP Duration

According to an embodiment of the present invention, the TXOP duration may be set to $X*2^Y-1$ (or $X*2^Y$). Values X and Y can be transmitted through the TXOP duration field.

If the TXOP duration field transmitted in the HE-SIG A is K bits, n bits (first n bits) of the K bits may indicate the value X and m bits thereof (e.g., m bits at the end) may indicate the value Y. The n bits may be n MSBs or n LSBs and the m bits may be m LSBs or m MSBs. The values K, m and n can be set in various manners.

For example, it is assumed that K=6, n=3 and m=3. When X□{1, 5, 10, 20, 30, 40, 50, 60} and Y□{0~7}, the TXOP duration may have a value in the range of 0 to 7,680 µs.

If a maximum of P ms (e.g., 5 ms) is indicated through the TXOP duration field (e.g., in the HE-SIG A), an (X, Y) combination that minimizes $X*2^Y-1$, from among (X, Y) combinations satisfying $X*2^Y-1 \geq P$ ms (e.g., 5 ms), may be used to indicate a maximum TXOP duration value and other (X, Y) combinations may not be used.

This example is one of methods of indicating the TXOP duration through $X*Z^Y-1$ and thus X, Y and/or Z may be changed in various manners.

Example 4 of TXOP Duration

According to an embodiment, the TXOP duration may be set in other units instead of 1 microsecond (µs) (e.g., larger units or the unit of a symbol). For example, larger units such as 4 µs, 8 µs, 10 µs, 16 µs, 32 µs, 50 µs, 64 µs, 100 µs, 128 µs, 256 µs, 500 µs, 512 µs, 1024 µs, . . . can be used. In this case, the TXOP duration value may be determined as "unit (e.g., 64 µs)*value of TXOP duration field". For example, in the case of 32 µs, TXOP Duration (1)=32 µs, TXOP Duration (2)=64 µs, TXOP Duration (3)=96 µs, . . . .

Meanwhile, it is desirable that the TXOP duration have a maximum value of 8 ms. Accordingly, in a case where a single unit is used, the following TXOP duration field options may be considered.

Option 1: A unit of 32 µs is used an 8-bit TXOP duration field is defined. Here, the maximum TXOP duration value can be 8,192 µs.

Option 2: A unit of 64 µs is used and a 7-bit TXOP duration field is defined. Here, the maximum TXOP duration value can be 8,192 µs.

If the TXOP field is set to more than 8 bits (e.g., 9 to 11 bits), the following TXOP duration field structures may be used.

Option 1-1: 16 µs unit, ~32 ms, 11 bits
Option 1-2: 16 µs unit, ~16 ms, 10 bits
Option 1-3: 16 µs unit, ~8 ms, 9 bits
Option 2-1: 32 µs unit, ~32 ms, 10 bits
Option 2-2: 32 µs unit, ~16 ms, 9 bits
Option 3-1: 64 µs unit, ~16 ms, 9 bits In addition, a combination of one or more units (e.g., (16 µs, 512 µs) or (8 µs, 128 µs), etc.) may be used. Or, 1× symbol or 4× symbol unit may be used instead of µs, or the TXOP duration may be indicated by N*1× symbols or N*4× symbols (N being a natural number).

Table 1 illustrates a TXOP duration indicated by 4× symbols.

TABLE 1

| TXOP duration field | Actual value (units: 4 × symbol) |
|---|---|
| 0 | 0 |
| 1 | 1 4 × symbol (i.e., 16 µs) |
| 2 | 2 4 × symbols (i.e., 32 µs) |
| 3 | 3 4 × symbols (i.e., 48 µs) |
| 4 | 4 4 × symbols (i.e., 64 µs) |
| 5 | 5 4 × symbols (i.e., 80 µs) |
| ... | ... |

The TXOP duration may be indicated by a combination of one of examples 1/2/3 and example 4.

Example 5 of TXOP Duration

According to an embodiment, the TXOP duration field may have a predefined value. For example, a table in which values set to the TXOP duration field (e.g., TXOP duration indices) are mapped to actual TXOP duration values may be predefined. Table 2 shows TXOP duration indices.

TABLE 2

| TXOP duration field | Actual value (units: µs) |
|---|---|
| 0 | A |
| 1 | B |
| 2 | C |
| 3 | D |
| 4 | E |
| 5 | F |
| ... | ... |

According to an embodiment, part of the range of the TXOP duration may be represented/configured as a first function form and another part of the range may be represented/configured as a second function form. For example, TXOP duration values may be set such that TXOP duration values increase in an exponential function to a specific value and TXOP duration values following the specific value increase in a uniform distribution function.

Table 3 illustrates a case in which the TXOP duration field is set to 4 bits. Referring to Table 3, the TXOP duration exponentially increases in the range of 32 µs to 512 µs (or 1,024 µs) and increases by 512 µs (approximately 0.5 ms) after 512 µs (or 1,024 µs).

TABLE 3

| TXOP Duration field | Actual value (unit: us) |
|---|---|
| 0 | 0 |
| 1 | 32 |
| 2 | 64 |
| 3 | 128 |
| 4 | 256 |
| 5 | 512 |
| 6 | 1024 |
| 7 | 1536 |
| 8 | 2048 |
| 9 | 2560 |
| 10 | 3072 |
| 11 | 3584 |
| 12 | 4096 |
| 13 | 4608 |
| 14 | 5120 |
| 15 | 5632 |

Table 4 illustrates a case in which the TXOP duration field is set to 5 bits. Referring to Table 4, the TXOP duration exponentially increases in the range of 32 µs to 256 µs (or 512 µs) and increases by 256 µs (approximately 0.25 ms) after 256 µs (or 512 µs).

TABLE 4

| TXOP Duration field | Actual value (unit: us) |
|---|---|
| 0 | 0 |
| 1 | 32 |
| 2 | 64 |
| 3 | 128 |
| 4 | 256 |
| 5 | 512 |
| 6 | 768 |
| 7 | 1024 |
| 8 | 1280 |
| 9 | 1536 |
| 10 | 1792 |
| 11 | 2048 |
| 12 | 2304 |
| 13 | 2560 |
| 14 | 2816 |
| 15 | 3072 |
| 16 | 3382 |
| 17 | 3584 |
| 18 | 3840 |
| 19 | 4096 |
| 20 | 4352 |
| 21 | 4608 |
| 22 | 4864 |
| 23 | 5120 |
| 24 | 5376 |
| 25 | 5632 |
| 26 | 5888 |
| 27 | Reserved |
| 28 | Reserved |
| 29 | Reserved |
| 30 | Reserved |
| 31 | Reserved |

Example 6 of TXOP Duration

According to an embodiment, the TXOP duration can be set through an X-bit scaling factor and a Y-bit duration value. For example, the TXOP duration can be set on the basis of Scaling factor (X bits)*Duration (Y bits). Specifically, TXOP duration=Scaling factor (X bits)*Duration (Y bits). Otherwise, TXOP duration=Scaling factor (X bits)*Duration (Y bits)+a, a being a predetermined constant (e.g., a=1).

The size of the TXOP duration field can be set to X+Y bits.

For example, the unit of the duration value can be set to one of 1 µs, 4 µs and 16 µs according to the scaling factor. The length of the Y bits can be set to various values.

Scaling factor index 0 of the X bits can indicate actual scaling factor=0. Case A and case B of Table 6 show examples of a 2-bit scaling factor.

TABLE 5

| Scaling factor field | Value | |
| --- | --- | --- |
| | Case A | Case B |
| 0 | 0 | 0 |
| 1 | 4 | 1 |
| 2 | 16 | 10 |
| 3 | 32 | 100 |

Table 7 shows examples of a 3-bit scaling factor.

TABLE 6

| Scaling factor field | Value |
| --- | --- |
| 0 | 0 |
| 1 | 1 |
| 2 | 4 |
| 3 | 16 |
| 4 | 32 |
| 5 | 64 |
| 6 | 128 |
| 7 | 256 |

The duration value may be represented in the form of $2^Y$.

Example 7 of TXOP Duration

According to an embodiment, the TXOP duration may be indicated through X-bit scaling factor, Y-bit duration value and Z-bit duration unit information. The TXOP duration may be "Scaling factor (X bits)*(Duration (Y bits) µs*Duration unit (Z bits) µs)." The size of the TXOP duration field may be set to (X+Y+Z) bits.

The Z-bit duration unit represents the unit of transmitted duration information. For example, when the Z bit is 1 bit, 0 can indicate the unit of 4 µs and 1 can indicate the unit of 16 µs. However, the present invention is not limited thereto.

TXOP Termination/Truncation Method

According to the above-described embodiment, the TXOP duration field of HE-SIG A can set a TXOP duration on the basis of a relatively large granularity. For example, the duration field included in the MAC header can be indicated based on a 1 µs granularity, whereas the TXOP duration field of HE-SIG A can be set to indicate a TXOP duration value on the basis of a granularity greater than the granularity of 1 µs.

When the TXOP duration is set by the TXOP duration field of HE-SIG A on the basis of a relatively large granularity, the TXOP duration can be set to a time longer than the time actually used for frame transmission. Accordingly, other STAs may set incorrect NAVs on the basis of HE-SIG A and thus cannot use channels for a specific time, and channel efficiency may be deteriorated.

To solve such problems, information for early termination of TXOP may be transmitted. For example, when a TXOP holder/responder transmits the last frame (e.g., ACK, Block ACK, Multi-STA BA) during a TXOP period, the TXOP holder/responder may include information indicating early termination of TXOP in the last frame and transmit the last frame. Early TXOP termination may be represented as TXOP truncation or simply as (early) termination/truncation. A description will be given of TXOP termination Methods.

(1) Method Using CF-END Frame

A TXOP holder/responder can transmit the last frame during a TXOP period and then terminate TXOP by transmitting a CF-END frame.

(2) Method Using Early Termination Indicator

According to an embodiment, an STA can include an early termination indicator in part of a frame (e.g., a common part of HE-SIG A and HE-SIG B, etc.) and transmit the frame. For example, the STA can indicate early TXOP termination by setting early termination indicator=1. TXOP can be terminated immediately after the frame including early termination indicator=1. The early termination indicator may be combined with the duration field when used. For example, early termination indicator=1 can indicate that TXOP is terminated at a time indicated by the duration field. When Duration=0, TXOP can be terminated after the corresponding frame. When the duration field has a value greater than 0, TXOP can be terminated at a time indicated by the duration field.

(i) The MD (more data) field or ESOP field may be reused as the early TXOP termination indicator.

(ii) In the case of a DL frame, the early termination indicator can be transmitted in the last frame of a set TXOP. For example, a TXOP duration is updated and transmitted along with the early termination indicator in the last frame. The TXOP duration is set to be less than a previous TXOP duration and TXOP termination can be indicated through the early termination indicator.

(iii) When TXOP information update is needed, an STA (e.g., a TXOP holder/responder) sets a TXOP updated when a frame is transmitted and transmits the frame. In the frame in which the TXOP is updated, the early termination indicator is used as a TXOP update indicator. For example, the early termination indicator can be set to 1 and transmitted whenever the TXOP is updated. Upon reception of a frame in which the early termination indicator is set to 1, an STA (e.g., a third party STA) updates the TXOP of the corresponding STA (e.g., NAV update).

(iv) In the case of single frame (e.g., PPDU) transmission, the TXOP duration can be set to the size of ACK/BA. In the case of multi-frame transmission, the TXOP duration is set for multi-frame and ACK/BA transmission.

(v) UL MU transmission: If a trigger frame is transmitted in a non-HT PPDU (e.g., 11a format), content of the trigger frame indicates a correct TXOP duration and thus even a legacy STA (e.g., STA that does not support 11ax) can correctly set the TXOP duration (e.g., NAV setting/update). In a UL MU frame, a TXOP duration corresponding to a transmission duration of an ACK/BA frame is indicated, and thus there is no problem in NAV setting/update.

However, when 11ax format is used and a TXOP duration set in HE-SIG A differs from TXOP duration information included in frame content (TXOP duration of the MAC header), a problem is generated. For example, some STAs (e.g., third party) may read only HE-SIG A and other STAs (e.g., third party) may read both the HE-SIG A and frame content.

STAs that have read both HE-SIG A and frame content set TXOP through duration information of the frame content (e.g., MAC header). For example, the STAs that have read both HE-SIG A and frame content store the duration information included in HE-SIG A. Upon read of the duration of the MAC header (or duration of the content), the STAs determine a final TXOP duration on the basis of the duration of the MAC header (or duration of the content) instead of the duration of HE-SIG A to update NAVs.

STAs that read only HE-SIG A update NAVs on the basis of the TXOP duration included in HE-SIG A. In this case, a problem that a TXOP duration longer than the actual TXOP duration of the MAC header is set may be generated. For example, when an ACK/BA/M-BA frame in response to a UL MU frame is transmitted, the STAs update TXOP through TXOP duration information included in HE-SIG A/B or the MAC header (e.g., NAV update) and can terminate TXOP at a corresponding time when the early termination indicator (or TXOP update indicator) is set to 1.

(vi) TXOP termination may be performed on the basis of a BSS color. For example, an STA (e.g., third party) may be configured to terminate TXOP only when TXOP termination is indicated through a frame corresponding to a BSS color thereof. The STA (e.g., third party) checks a BSS color included in a frame. If the BSS color indicates other BSSs, the STA (e.g., third party) does not terminate TOXP even when the frame indicates TXOP termination. Accordingly, the STA (e.g., third party) can terminate/truncate TXOP only when a frame of the BSS thereof indicates TXOP termination (e.g., explicit indication or implicit indication in which duration is set to 0). However, loss of access opportunity of the STA for other BSSs may occur.

(vi) According to an embodiment, when an STA (e.g., a TXOP holder/responder) transmits 11ax frames within TXOP, the STA can necessarily include TXOP termination/ truncation information in the last frame and transmit the last frame. In the case of 11a frames, correct TXOP can be set because TXOP is set through the duration of the MAC header. In an embodiment, the TXOP duration of HE-SIG may be overwritten by the duration of the MAC header.

(3) Method Using Duration Field Value of Last Frame

According to an embodiment, an STA (e.g., a TXOP holder/responder) may indicate early termination/truncation of TXOP by setting the duration field value of the last frame to a specific value (e.g., setting the duration field value to 0 or setting all bits to 1) instead of using an explicit TXOP termination indicator. Accordingly, upon reception of a frame indicating Duration=specific value (e.g., 0), an STA (e.g., third party) can determine that the TXOP duration has been terminated/truncated after the frame. This can be understood as a function similar to the CF-END frame.

(4) NAV Update/Reset for TXOP Duration Termination

According to legacy NAV setting/update methods, NAV update is performed only when a TXOP duration value of a received frame exceeds a current NAV value set to an STA (e.g., third party). For early TXOP termination, NAV update needs to be performed even when the TXOP duration value of the received frame is less than the current NAV value set to the STA (e.g., third party). According to an embodiment, the STA may update the NAV to a TXOP duration value less than the current NAV value set thereto on the basis of the TXOP truncation/termination/update indicator. However, NAV update to a TXOP duration shorter than the current NAV value may be performed on the basis of only a TXOP truncation/termination/update indicator included in myBSS.

NAV Management

Figure 23:
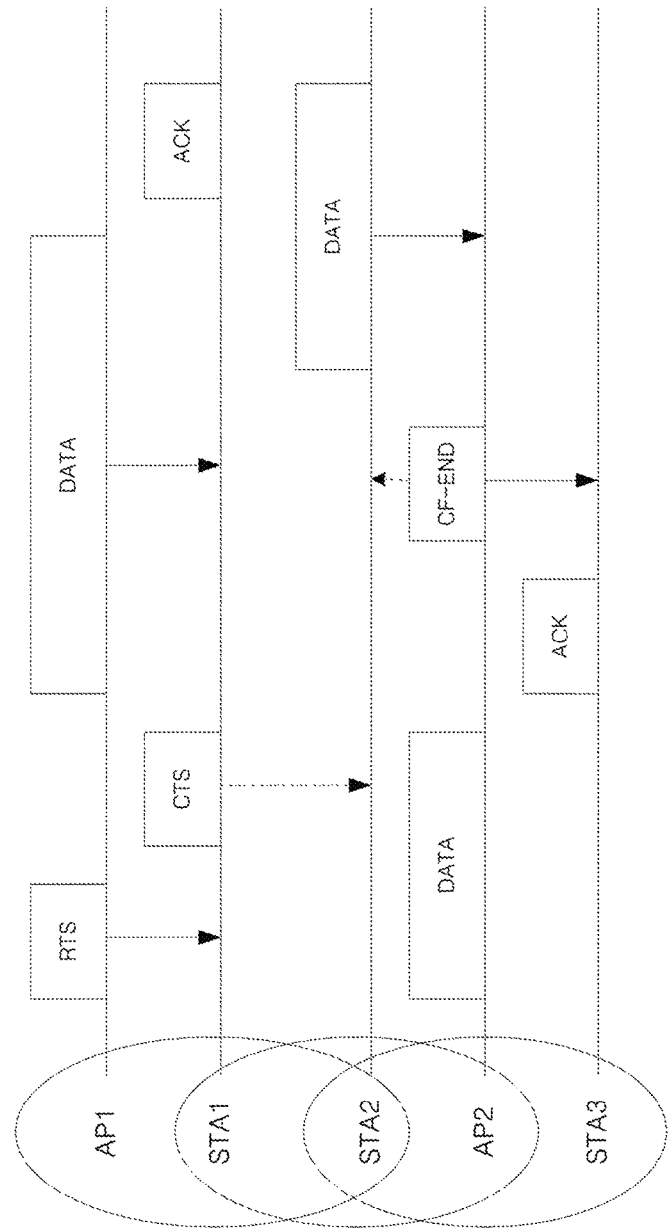
FIG. 23 illustrates problems in legacy NAV management methods.

FIG. 23 illustrates problems in a legacy NAV management method.

In a legacy wireless LAN system (e.g., 11a/b/g/n/ac), an STA maintains a single NAV. When the STA receives a frame (a frame that does not indicate the STA as a receiver), the STA determines whether a NAV calculated by the duration field (e.g., MAC duration) in the MAC header of the frame exceeds the current NAV set to the STA. When the NAV calculated by the MAC duration exceeds the current NAV, the STA updates the NAV through the MAC duration.

If the STA receives a CF-END frame when the current NAV of the STA that manages only one NAV is not 0, the STA resets the NAV (e.g., sets a NAV timer to 0). However, if the NAV has been updated according to multiple frames before the NAV is reset, resetting the NAV in response to the CF-END may affect transmission of other frames.

Referring to FIG. 23, it is assumed that AP 2 and STA 3 transmit/receive frames to/from each other and a NAV is set to STA 2 for transmission/reception between AP 2 and STA 3. In addition, it is assumed that frame exchanges between AP 2 and STA 3 do not affect AP 1 and STA 1. For example, it is assumed that channel access of (AP 2 and STA 3) and channel access of (AP 1 and STA 1) do not affect each other.

Accordingly, AP 1 and STA 1 can exchange RTS and CTS frames even while AP 2 and STA 3 exchange frames (e.g., data/ACK). For example, AP 1 designates STA 1 as a receiver and transmits the RTS frame to STA 1. STA 1 transmits the CTS frame to AP 1 in response to the RTS frame. The RA field of the CTS frame may be set to be identical to the TA field of the RTS frame, the duration of the CTS field may be acquired from the duration of the RTS frame, and the TA field may be omitted in the CTS frame.

It is assumed that STA 2 has received the CTS frame of STA 1 although AP 1 has not received the RTS frame of AP 1. Upon reception of the CTS frame of STA 1, STA 2 recognizes that STA 2 is not designated as a receiver of the CTS frame and updates the NAV on the basis of the duration indicated by the CTS frame. For example, STA 2 updates the NAV when the duration indicated by the CTS frame exceeds the current NAV value of STA 2.

AP 2 transmits a CF-END frame for TXOP truncation upon reception of ACK from STA 3. AP 2 transmitting the CF-END frame cannot recognize that the NAV of STA 2 has been updated according to the CTS frame of STA 1.

STA 2 resets the NAV on the basis of the CF-END frame received from AP 2. For example, STA 2 resets the NAV upon reception of the CF-END frame from AP 2 even though STA 2 has updated the NAV for TXOP protection of AP 1/STA 1. According to legacy NAV management operation, when a control frame such as CF-END/RTS/CTS is received, an STA determines whether the address thereof is identical to the RA (Receiver Address) of the control frame. The STA manages a single NAV for frames that are not consistent with the address of the STA irrespective of a TXOP holder/responder.

Since STA 2, which has reset the NAV, can perform channel access, STA 2 can transmit data to AP 2. However, data frame transmission of STA 2 affects data/ACK transmission and reception between AP 1 and STA 1.

When it is assumed that the NAV is updated through TXOP holder/responder 1 (e.g., AP1/STA1) and reset by TXOP holder/responder 2 (e.g., AP2/STA3) while the NAV is not terminated, NAV reset may affect data transmission and reception of TXOP holder/responder 1.

NAV management (e.g., setting, update and/or resetting) methods for solving the above-described problems of the legacy NAV management operation will be described.

According to an embodiment, an STA can manage NAVs in consideration of a BSS.

For example, the STA may set and maintain a NAV per BSS color. When a frame indicating TXOP truncation is received, the STA that has set a NAV per BSS color can truncate TXOP of a NAV corresponding to a BSS color indicated by the frame.

Furthermore, to reduce complexity of NAV setting and management, the STA may set and maintain two NAVs such as a myBSS NAV and an other BSS NAV (e.g., NAV for a BSS other than myBSS or a frame that does not indicate myBSS). "MyBSS NAV" may also be referred to as intra-BSS NAV and "other BSS NAV" may also be referred to inter-BSS NAV, regular NAV or non-intra-BSS NAV. However, the present invention is not limited thereto NAV Management Example 1

According to an embodiment, an STA can maintain/manage NAVs through a combination of {RA (Receiver Address), TA (Transmitter Address)} or a combination of {SA (Source Address), DA (Destination Address)}.

For example, if the STA manages NAVs through a combination of {RA, TA}, the STA needs to maintain different NAVs for frames having different combinations of {RA, TA}. According to this method, the number of NAVs in a NAV list that the STA needs to maintain increases when a dense environment such as 11ax is considered. Accordingly, complexity of management and update of NAVs by the STA increases and thus the method may be inefficient in 11ax. Table 7 shows a NAV list depending on {RA, TA} combinations. For example, each NAV is indexed by an {RA, TA} combination.

TABLE 7

| RA(or DA) | TA (or SA) | NAV |
|---|---|---|
| 1 | 1 | A |
| 1 | 2 | B |
| 1 | 3 | C |
| ... | ... | ... |
| 2 | 1 | D |
| 2 | 2 | E |
| ... | ... | ... |
| x | y | Z |

NAV Management Example 2

According to an embodiment of the present invention, an STA can maintain/manage a NAV per BSS (e.g., BSSID or BSS color).

For example, it is assumed that the STA maintaining/managing a NAV per BSSID receives different frames having the same BSSID, and a duration (e.g., TXOP duration and/or MAC duration) indicated by a frame received later from among the frames is longer than the current NAV (e.g., the current NAV for the BSSID). The STA updates the NAV for the corresponding BSSID using the duration of the received frame.

A separate NAV can be set for a frame (e.g., ACK or CTS) having no BSSID. For example, the STA can manage a NAV for a frame having no BSSID using a specific BSSID value (e.g., which is not an actual BSSID but a virtual BSSID having a BSSID format). The specific BSSID value may correspond to a CTS frame, ACK frame or (CTS&ACK) frame. Accordingly, the STA maintains a NAV corresponding to CTS/ACK/(CTS&ACK) even when a CF-END frame is received. In addition, when the STA receives a CF-END frame, the STA can reset only a NAV corresponding to a BSSID included in the CF-END frame.

Table 8 shows NAVs set on the basis of BSSIDs.

TABLE 8

| BSSID | NAV |
|---|---|
| 1 | A |
| 2 | B |
| 3 | C |
| ... | ... |
| X (BSSID for CTS) | J |

TABLE 8-continued

| BSSID | NAV |
|---|---|
| Y (BSSID for ACK) | K |
| Z (BSSID for CTS&ACK) | L |
| ... | ... |
| AA (BSSID for BSS Color(A)) | BA |
| AB (BSSID for BSS Color(B)) | BB |
| ... | ... |

In Table 8, when a NAV (e.g., L) is set for a BSSID (e.g., Z) corresponding to CTS&ACK, NAV J/K for BSSID X/BSSID Y may not be additionally set. For example, TXOPs of CTS&ACK, CTS and ACK frames may be integrally managed through NAV L indexed by BSSID Z.

Although ACK and CTS frames are illustrated for convenience, the present invention is not limited thereto and BSSIDs and/or NAVs corresponding to other control frames or management frames may be set.

When an RA included in an ACK/CTS frame corresponds to one of BSSIDs in the NAV table shown in Table 8, the STA may update a NAV for the corresponding BSSID to the duration of the received ACK/CTS frame and may not update a NAV dedicated for CTS/ACK. For example, when a NAV is present for a BSS having a BSSID value set in an RA field, the STA preferentially updates the NAV. However, when a NAV is not present for the BSS having the BSSID value set in the RA field, the STA can update the NAV dedicated for CTS/ACK.

If a received frame includes only BSS color information (e.g., a frame in which BSSID information is not present) and a BSSID mapped to the corresponding BSS color is present, the STA may add or update a NAV using the mapped BSSID. If there is no BSSID mapped to the corresponding BSS color, the STA can assign one BSSID to the BSS color and maintain the BSSID. If the STA can read both the BSS color and the BSSID in the frame, the STA can update a NAV corresponding to the BSSID.

Table 9 shows NAVs respectively set for BSS colors.

TABLE 9

| BSS Color | NAV |
|---|---|
| 1 | A |
| 2 | B |
| 3 | C |
| ... | ... |
| X (BSS Color for CTS) | J |
| Y (BSS Color for ACK) | K |
| Z (BSS Color for CTS&ACK) | L |
| ... | ... |
| AA (BSS Color for BSSID(A)) | BA |
| AB (BSS Color for BSSID(B) & BSSID(C) ) | BB |
| ... | ... |

When the STA knows BSSID information mapped per BSS color and a frame having no BSS color (e.g., a legacy frame such as 11a/b/g/n/11ac (DL)) includes BSSID information, the STA adds or updates NAVs for BSS colors mapped to BSSIDs using the duration of the frame. When frames including no BSS color and BSSID, such as ACK/CTS, are received in a legacy PPDU format, the STA can map a specific BSS color value to the frame to maintain and manage (e.g., add and update) NAVs.

According to an embodiment, NAVs may be managed through combinations of {BSSID, BSS Color}. Table 10 shows NAVs identified by combinations of {BSSID, BSS Color}.

TABLE 10

| (BSSID, BSS Color) | NAV |
|---|---|
| (1, 1) | A |
| (2, 2) | B |
| (3, 0) | C |
| ... | ... |
| X (BSS Color for CTS) | J |
| Y (BSS Color for ACK) | K |
| Z (BSS Color for CTS&ACK) | L |
| ... | ... |
| AA (BSS Color for BSSID(A)) | BA |
| AB (BSS Color for BSSID(B) & BSSID(C) ) | BB |
| ... | ... |

NAV Management Example 3

According to an embodiment of the present invention, an STA can maintain and manage a single NAV (e.g., a single NAV timer). The STA can maintain information about what is used to update the NAV in NAV update.

Table 11 shows an ID used for updating the latest NAV according to an embodiment of the present invention.

TABLE 11

| Identification used for updating the latest NAV (e.g, BSSID, TA, etc.) | NAV |
|---|---|
| e.g., if BSS Color, the value is 1 | A |

The ID used for updating the latest NAV may be mapped to the corresponding NAV. For example, the ID used for updating the latest NAV may be at least one of a BSS color, BSSID, {BSSID, BSS Color}, RA, TA, SA, DA, {RA, TA}, {RA, SA}, {DA, SA} and {DA, TA}, but the ID is not limited thereto.

Table 12 shows a case in which a combination of {RA, TA} is used.

TABLE 12

| (RA, TA) | The latest NAV |
|---|---|
| (1, 2) | A |

Table 13 shows a case in which a BSSID is used.

TABLE 13

| BSSID | The latest NAV |
|---|---|
| 9 | A |

If the STA updates the NAV according to frames that do not include the ID, one of the methods described in NAV management example 2 may be used. For example, when the BSSID is used as in Table 13 and ACK/CTS frames do not include the BSSID (or information mapped to the BSSID), the STA may map a specific BSSID (e.g., virtual BSSID) to the ACK/CTS frames and perform NAV update. For example, when a BSSID for ACK/CTS is designated as X in the system and the STA receives ACK or CTS, the STA can update the ID (e.g., BSSID) used to update the latest NAV in the NAV table to X.

When the ID corresponding to the NAV is maintained along with the NAV and the STA receives a frame (e.g., CF-END) indicating TXOP truncation, the STA can perform TXOP truncation only when one piece of ID information (e.g., RA, TA, BSS color, BSSID, etc.) of the frame is consistent with the ID corresponding to the NAV. For example, when the NAV is managed on the basis of the BSSID, as shown in Table 13, the STA can perform TXOP truncation only when a CF-END frame includes information corresponding to the BSSID of the current NAV. If the CF-END frame does not include the information corresponding to the BSSID of the current NAV, the STA may not perform TXOP truncation.

In an embodiment of the present invention, the STA may maintain a {BSS Color, BSSID} list by overhearing transmitted frames. When a frame including a BSS color only or a BSSID only is received, the STA may acquire a BSSID corresponding to the BSS color or a BSS color corresponding to the BSSID using the {BSS Color, BSSID} list.

Table 14 shows a case in which a combination of {BSSID, BSS Color} is used.

TABLE 14

| (BSSID, Color) | The latest NAV |
|---|---|
| (9, 3) | A |

The STA can acquire a BSS color for myBSSID through various methods (e.g., management frames such as a beacon, probe response and the like). Accordingly, when the STA receives a frame transmitted from myBSS, the STA can update a BSS color and a BSSID together irrespective of whether the frame is a legacy PPDU or HE (i.e., 11ax) PPDU. For example, when the STA receives an 11ax PPDU including myBSS color, the STA can update the BSS color and myBSSID together during NAV update. When the STA receives a legacy PPDU including myBSSID information, the STA can update the BSSID and BSS color together during NAV update.

When the STA receives a frame indicating TXOP truncation (e.g., CF-END, frame with duration=0 or the like) and one or more pieces of information (e.g., BSS color, BSSID, TA, RA, etc.) included in the frame correspond to the BSSID or BSS color mapped to the current NAV, the STA can perform NAV truncation. When the information included in the frame does not correspond to the BSSID/BSS color mapped to the current NAV, the STA may not perform NAV truncation.

If the STA receives a frame of an OBSS or acquires only a BSS color for an 11ax PPDU when the STA does not include the {BSSID, BSS Color} list, the STA can set the BSSID mapped to the NAV to 0. When a legacy PPDU is received and the STA acquires only a BSSID without a BSS color, the STA may set the BSS color mapped to the NAV to 0.

When the STA receives a control frame and the control frame includes information consistent with at least one of myBSS color and myBSSID, the STA can update {BSSID, BSS Color} information mapped to the NAV along with the NAV.

If the control frame includes no information consistent with {BSSID, BSS Color} mapped to the NAV (e.g., other BSS control frame), the STA can map an {RA, TA} combination to the NAV for the control frame. Then, when a frame indicating TXOP truncation is received and the frame includes ID information consistent with ID information (e.g., {BSS color, BSSID} or {RA, TA}) mapped to the NAV, the STA can perform TXOP truncation. If the received frame does not include the ID information mapped to the NAV, the STA may not perform TXOP truncation.

The STA may map ID type information indicating whether the ID mapped to the NAV is a {BSS Color, BSSID} combination or an {RA, TA} combination to the NAV. The STA can recognize an ID mapped to the NAV through ID type information. Table 15 shows ID type information according to an embodiment.

TABLE 15

| ID Type | ID value | Corresponding latest NAV |
|---|---|---|
| 0 = (BSS Color, BSSID) or<br>1 = (TA, RA) | (9, 3) | A |

NAV Management Example 4

According to an embodiment of the present invention, an STA can store a TXOP holder address upon reception of a frame initiating TXOP.

For example, TA (Address 2, Transmitter Address) indicates a TXOP holder address in the RTS frame and RA (Address 1, Receiver Address) indicates a TXOP holder address in the CTS frame.

The STA can store the TXOP holder address while updating a NAV based on the corresponding frame. Then, when a CF-END frame indicating TXOP truncation is received, the STA compares the TA of the CF-END frame with the TXOP holder address mapped to the NAV. If the TA of the CF-END frame is consistent with the TXOP holder address mapped to the NAV, the STA performs TXOP truncation. However, when the TA of the CF-END frame is not consistent with the TXOP holder address mapped to the NAV, the STA can maintain the NAV.

According to an embodiment of the present invention, the STA can maintain NAV information before NAV update. For example, the NAV information before NAV update may include at least one of a NAV value before update and TXOP holder information before update.

For example, the STA may maintain a previous NAV value and a TXOP holder address for the previous NAV value as well as the TXOP holder address for the current NAV. To maintain the previous NAV value, the STA may store a previous NAV timer during NAV update or store a NAV difference value as information for calculating the previous NAV value. For example, when the STA receives a frame and updates a NAV, the STA can store {duration indicated in the frame−current NAV value} as a NAV difference value.

Subsequently, when a CF-END frame is received and the TA of the CF-END frame is consistent with the TXOP holder address of the current NAV, the STA compares the TXOP holder address of the previous NAV with the TA of the CF-END frame instead of resetting the NAV. When the TXOP holder address of the previous NAV is consistent with the TA of the CF-END frame, the STA resets the NAV. When the TXOP holder address of the previous NAV is not consistent with the TA of the CF-END frame, however, the STA restores the previous NAV value rather than resetting the current NAV (e.g., using the NAV difference value). When the TA of the CF-END frame is not consistent with the TXOP holder address of the current NAV, the STA maintains the current NAV.

According to an embodiment, the operation of an STA to receive a TXOP initiation frame and store a TXOP holder address may be limited to the address of a TXOP holder of a BSS associated with the STA. Furthermore, the STA may store only the address of an AP associated therewith as a TXOP holder address. For example, when the AP transmits a TXOP initiation frame such as RTS, the TXOP holder address is TA (Address 2). In the case of CTS transmitted by the STA, RA (Address 1, AP address) of the AP is the TXOP holder address.

As described above, an STA (e.g., AP or non-AP STA) can store a TXOP holder address (or the address of a TXOP holder associated with the STA) and/or a BSS color (color of a BSS associated with the STA) upon reception of a frame. For example, when the STA receives a frame from the BSS associated therewith, the STA can store {TXOP holder address, BSS color} of the BSS. If the STA receives a frame having no BSS color (e.g., a frame transmitted using a legacy PPDU having no BSS color such as RTS/CTS/trigger frame/ACK/block ACK) and a TXOP holder address included in the frame is consistent with the MAC address of an AP associated with the STA, the STA can store a BSS color for the AP, previously known to the STA, along with the TXOP holder address.

When the RA of a received MU-RTS/RTS frame does not include the address/ID (e.g., AID or partial AID) of the STA and the TA includes the TXOP holder address of a BSS associated with the STA, the STA stores {TXOP holder address, BSS color} along with a NAV value. When the STA needs to reset a NAV set by the MU-RTS/RTS frame, the STA can check the BSS color and reset the NAV.

NAV Management Example 5

According to a legacy NAV update method, when a NAV is set by an OBSS (other BSS) frame and then myBSS frame is received, and a NAV value of myBSS frame exceeds the current NAV value (e.g., a NAV set by the OBSS frame), a relevant STA updates the NAV on the basis of myBSS frame. For example, when the STA receives a frame (e.g., CF-END/ trigger frame/CTS/ACK/BA) that requires NAV update (e.g., change, reset, cancelation or the like) from an STA/AP of myBSS, the STA updates the NAV upon reception of the frame.

Figure 24:
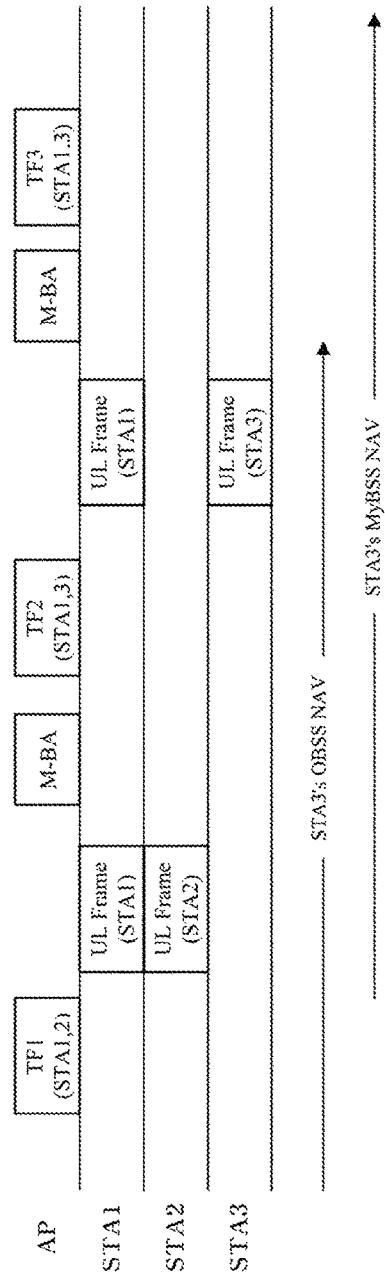
FIG. 24 illustrates existing NAV management related to UL MU transmission.

FIG. 24 illustrates legacy NAV management related to UL MU transmission. It is assumed that STA 1, STA 2 and STA 3 are associated with an AP and STA 3 receives trigger frame (TF) 1 from myAP in a state that STA 3 has received an OBSS frame and set a NAV.

Referring to FIG. 24, since TF 1 does not include resource allocation information about STA 3, STA 3 updates the NAV through the duration value of TF 1 when the duration value of TF 1 exceeds the current NAV set to STA 3.

Thereafter, myAP transmits TF 2 to allocate UL resources to STA 3. Since the NAV has been set to STA 3 by myBSS, STA 3 can ignore the NAV and perform UL transmission. However, such UL transmission of STA 3 may affect OBSSs.

(1) NAV Management Example 5-1: NAV Difference Value

As a method for solving such problems, a method of using an OBSS NAV difference value may be considered. The OBSS NAV difference value may simply be referred to as a NAV difference value.

For example, the STA can calculate and store an OBSS NAV difference value when updating a NAV set by an OBSS frame on the basis of myBSS frame while maintaining a single NAV timer. The OBSS NAV difference value can be calculated as {NAV timer of received myBSS frame−current NAV timer (e.g., NAV timer most recently updated by OBSS)}.

Upon storage of the OBSS NAV difference value, the STA can determine whether the OBSS NAV is currently valid using the NAV difference value when the NAV is updated by myBSS frame (e.g., when the current NAV is reset or when the current NAV is ignored or is not considered according to an indication of a trigger frame received from myAP).

If the OBSS NAV is valid, the STA considers the OBSS NAV (e.g., defers channel access until the OBSS NAV is terminated). The STA can check whether the OBSS NAV is valid by calculating {current NAV timer−NAV difference value} at the present time. For example, when {current NAV timer−NAV difference value} exceeds an effective OBSS NAV threshold value (e.g., 0), the STA can determine that the OBSS NAV is valid. If {current NAV timer−NAV difference value} is equal to or less than 0, the STA can determine that the OBSS NAV is not valid. The STA may not maintain the NAV difference value or may set the NAV difference value to 0 when the OBSS NAV is not valid. When the NAV difference value is not present or is set to 0, the STA can perform channel access regardless of the OBSS NAV. If the STA considers the NAV, this may mean that the STA does not attempt frame transmission on the assumption that channels are busy.

The NAV difference value stored in the STA can be used to determine whether an OBSS NAV timer, which would have been maintained if NAV update had not been performed according to myBSS frame, is terminated at present or has remaining time.

Figure 25:
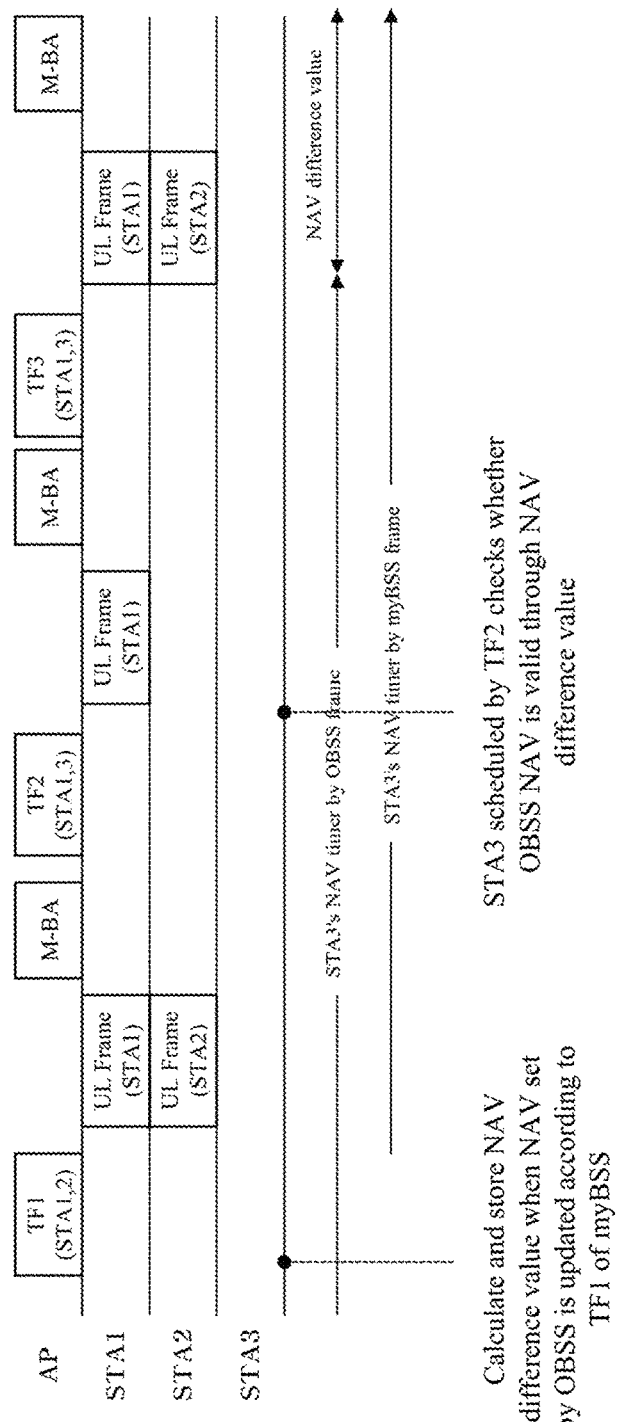
FIG. 25 illustrates NAV management according to an embodiment of the present invention.

FIG. 25 illustrates a method of managing a NAV using the NAV difference value.

Referring to FIG. 25, STA 3 maintains a NAV set by OBSS and receives TF 1 from an AP corresponding to myBSS (or intra-BSS) STA. STA 3 updates the NAV thereof on the basis of TF 1 when the NAV (e.g., duration) of TF 1 exceeds the current NAV (e.g., OBSS NAV). Here, STA 3 can calculate and store a NAV difference value (e.g., duration value of TF 1−current NAV timer).

Upon reception of TF 2 including scheduling information of STA 3, STA 3 checks whether the OBSS NAV is valid prior to transmission based on TF 2. For example, when {current NAV timer−NAV difference value} exceeds an effective OBSS NAV threshold value (e.g., 0), STA 3 can consider the OBSS NAV to be valid. While the OBSS NAV is valid, STA 3 can defer frame transmission based on TF 2.

The OBSS NAV difference value may not be valid when the NAV is updated according to myBSS frame (e.g., intra-BSS frame).

Figure 26:
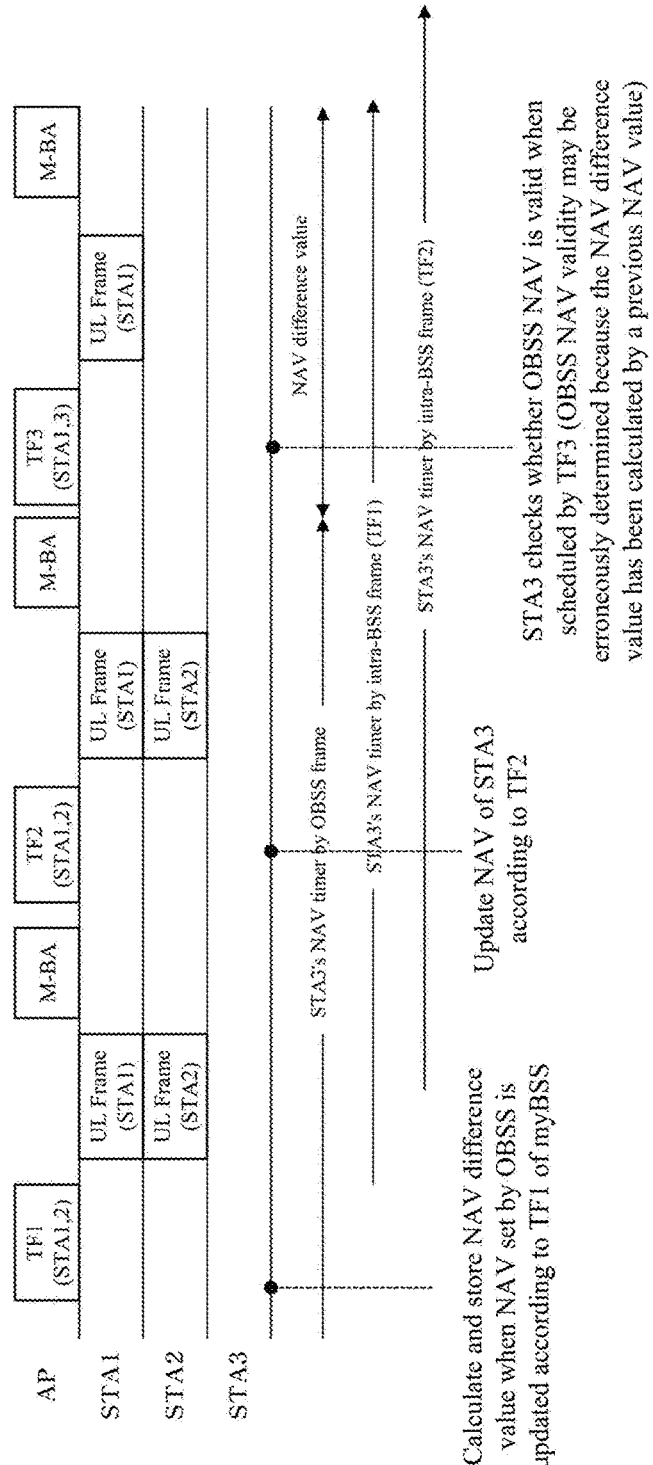
FIG. 26 illustrates NAV management according to another embodiment of the present invention.

FIG. 26 illustrates NAV update based on myBSS frame.

Referring to FIG. 26, STA 3 updates a NAV, which has been set through an OBSS frame, through TF 1 (e.g., received from an AP associated with STA 3). STA 3 can calculate and store a NAV difference value (e.g., NAV value depending on the duration of the received frame−current NAV value) for NAV update through TF 1.

STA 3 receives TF 2 and updates the NAV.

When STA 3 is assigned UL resources through TF 3, STA 3 checks whether the OBSS NAV is valid using the NAV difference value. However, since the NAV difference value is calculated on the basis of the previous NAV (e.g., TF 1), the NAV difference value stored in STA 3 may be an incorrect value at the time when TF 3 is received and may not be suitable for OBSS NAV validity check.

(2) NAV Management Example 5-2: NAV Difference Value Update

As a method for solving the aforementioned problems, an STA can update a NAV difference value when a NAV of the STA is updated.

For example, the STA checks whether an OBSS NAV is valid using the NAV difference value when updating the NAV. For example, the STA considers the OBSS NAV to be valid when the result of {current NAV value−NAV difference value} exceeds an effective OBSS NAV threshold value (e.g., a default value is 0).

When the OBSS NAV is not valid, the STA can set the NAV difference value to 0. For example, an OBSS NAV difference value of 0 can indicate that the OBSS NAV is not valid.

When the OBSS NAV is valid, the STA can update the NAV difference value. The STA can update the NAV difference value through the duration of a frame used for NAV update. For example, the STA can update the NAV difference value to {NAV value (e.g., duration) according to the corresponding frame−(current NAV value−NAV difference value)} and update the NAV thereof.

Figure 27:
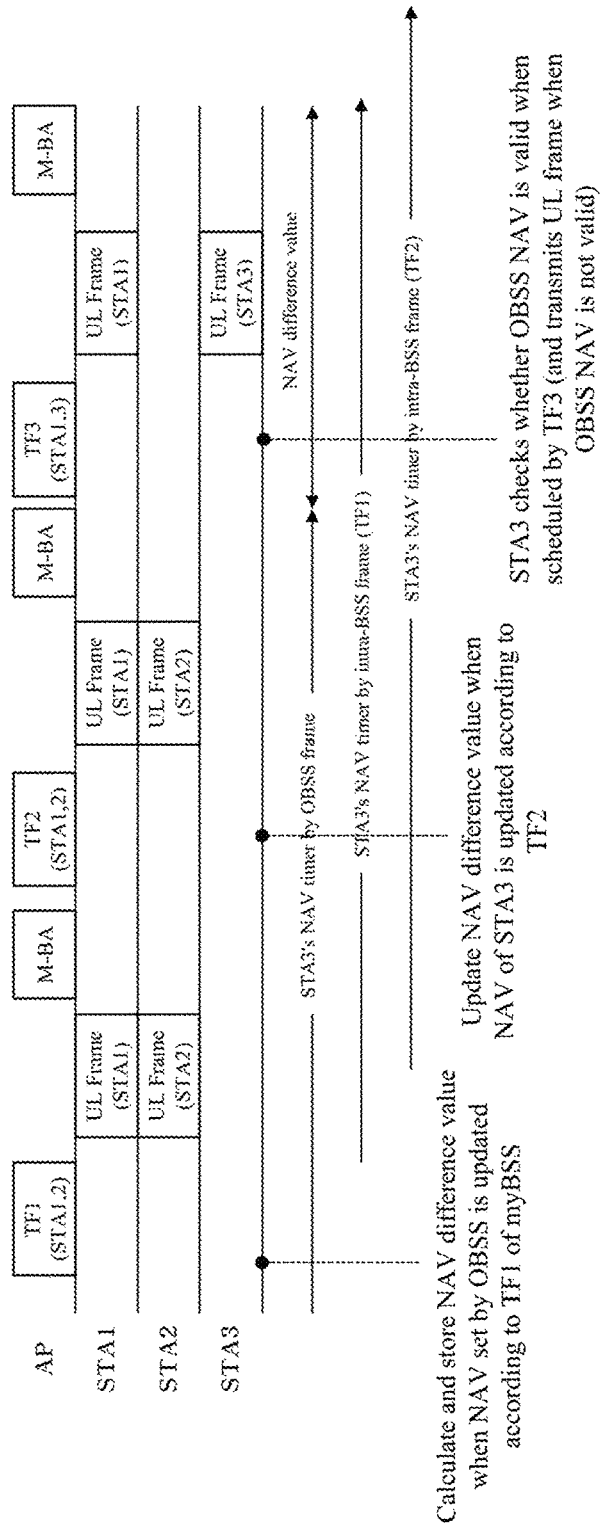
FIG. 27 illustrates update of a NAV difference value according to an embodiment of the present invention.

FIG. 27 illustrates NAV difference value update. It is assumed that STA 3 has a NAV updated according to an OBSS frame before reception of TF 1.

STA 3 receives TF 1 from an AP thereof and updates the NAV. STA 3 calculates and stores a NAV difference value before NAV update using the duration of TF 1.

STA 3 checks whether the OBSS NAV is valid for reception of TF 2 and NAV update. When the OBSS NAV is valid, STA 3 can update the NAV difference value on the basis of the duration of the currently received frame (e.g., TF2). For example, STA 3 can update the NAV difference value to {NAV value according to the received frame−(current NAV value−stored NAV difference value)}. Subsequently, STA 3 can update the NAV through TF 2.

Upon reception of TF 3 including UL resource allocation for STA 3, STA 3 checks whether the OBSS NAV is valid using the NAV difference value. It is assumed that the OBSS NAV is not valid for convenience. Accordingly, STA3 transmits a UL MU frame in response to TF 3.

NAV difference value update may be performed when the OBSS NAV is updated according to other OBSS frames. For example, it is assumed that the STA has received an OBSS frame and the OBSS NAV is currently valid. The STA checks whether a NAV value according to the received OBSS frame exceeds the current OBSS NAV (=current NAV value−stored NAV difference value) using the NAV difference value.

When the NAV value according to the received OBSS frame exceeds the current OBSS NAV, the STA updates the NAV difference value to {current NAV value−NAV value according to the received OBSS frame}. Here, the STA can maintain the NAV thereof (e.g., current NAV value). Such NAV difference value update is performed for the STA to update the OBSS NAV without updating the current NAV through the received OBSS frame.

Figure 28:
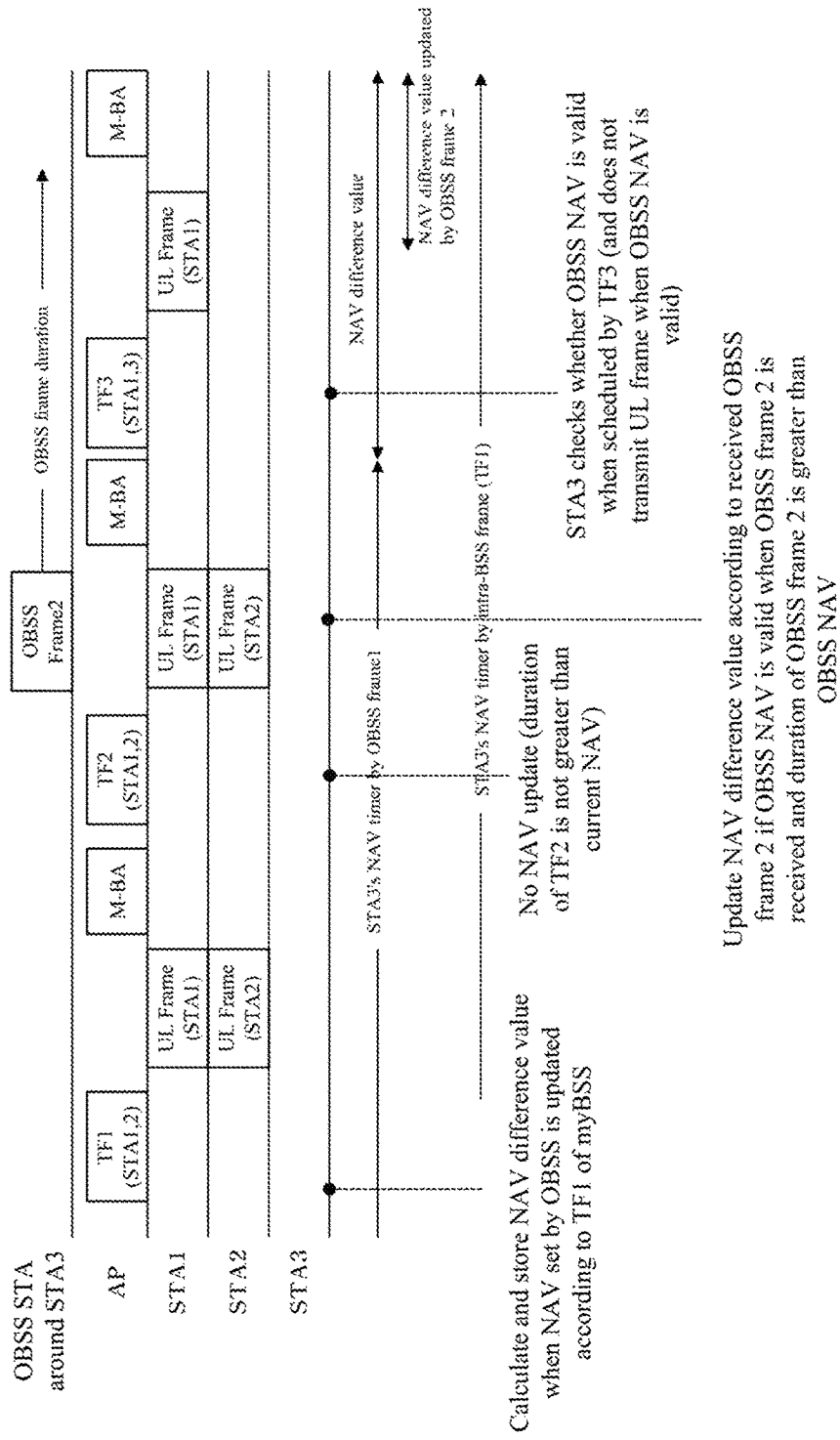
FIG. 28 illustrates update of a NAV difference value according to another embodiment of the present invention.

FIG. 28 illustrates NAV difference value update according to another embodiment of the present invention. It is assumed that STA 3 has updated the NAV according to OBSS frame 1 and then updates the NAV upon reception of TF 1 from the AP thereof.

STA 3 calculates a NAV difference value before NAV update using the duration of TF 1. For example, the NAV difference value may correspond to {NAV according to the received frame (i.e., the duration value of the frame)−current NAV timer}. The STA stores the calculated NAV difference value.

It is assumed that STA 3 receives TF 2 but does not perform NAV update, and thus the current NAV timer is maintained.

Subsequently, STA 3 receives OBSS frame 2 from an OBSS STA and checks whether the OBSS NAV is valid. Here, it is assumed that the OBSS NAV is valid. STA3 checks whether a NAV (e.g., duration) according to received OBSS frame 2 exceeds the OBSS NAV.

When the NAV according to OBSS frame 2 exceeds the OBSS NAV, STA 3 re-calculates (e.g., updates) the NAV difference value using the duration of the OBSS frame. For example, STA 3 can calculate the NAV difference value according to {current NAV timer−OBSS NAV according to OBSS frame 2} and store the calculated NAV difference value.

Then, STA 3 receives TF 3 and is assigned UL resources through TF 3. STA 3 checks whether the OBSS NAV is valid using the NAV difference value prior to UL transmission. It is assumed that the OBSS NAV is valid for convenience. Accordingly, STA 3 does not transmit a UL MU frame until the OBSS NAV expires.

NAV Management Example 6

A description will be given of other embodiments for solving the problems of the legacy NAV management method described above with reference to FIG. 24.

(1) NAV Management Example 6-1: Multiple NAV Timers

According to an embodiment of the present invention, an STA can respectively maintain/manage myBSS (e.g., intra-BSS) NAV timer and an OBSS (e.g., inter-BSS) NAV timer. If NAV update is required according to myBSS frame, the STA can update myBSS NAV timer. If NAV update is required according to an OBSS frame, the STA can update the OBSS NAV timer.

Figure 29:
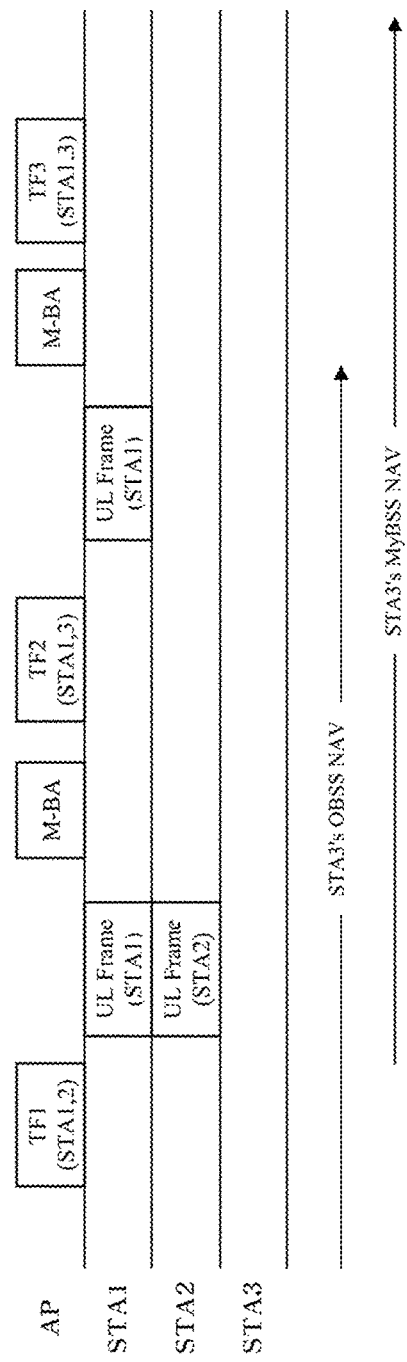
FIG. 29 illustrates NAV management according to another embodiment of the present invention.

FIG. 29 illustrates NAV setting according to an embodiment of the present invention.

Referring to FIG. 29, STA 3 updates (e.g., sets, changes, minimizes or resets) the OBSS NAV timer and does not update myBSS NAV timer upon reception of an OBSS frame.

STA 3 sets or updates myBSS NAV timer and does not update the OBSS NAV timer upon reception of myBSS frame.

An STA does not perform channel access if any of myBSS NAV and an OBSS NAV has a value greater than 0.

The STA may maintain a legacy NAV timer instead of myBSS NAV timer. For example, the STA can maintain a NAV timer operating like a legacy NAV timer and an OBSS NAV timer. For example, the legacy NAV timer is updated without discrimination between an intra-BSS frame and an inter-BSS frame (e.g., as in legacy methods) whereas the OBSS NAV timer is updated only according to an OBSS (inter-BSS) frame.

Accordingly, if the OBSS NAV timer is valid even when the legacy NAV timer has been updated according to a frame transmitted by an intra-BSS STA, the STA may not transmit a UL MU frame in consideration of the OBSS NAV. In addition, the STA can determine the OBSS NAV to be valid when the OBSS NAV timer exceeds an effective OBSS NAV threshold value (e.g., a default value is 0).

The effective OBSS NAV threshold value can be determined by the system and delivered to the STA through a broadcast/multicast frame such as a beacon or a unicast frame.

(2) NAV Management Example 6-2: Single NAV Timer

According to an embodiment of the present invention, an STA maintains a single NAV as in legacy NAV management and can calculate and store an OBSS NAV difference value when a NAV set according to an OBSS frame is updated according to myBSS frame. The OBSS NAV difference value can be calculated according to {NAV timer of the received frame−current NAV timer}. For example, the NAV timer of the received frame can be calculated through the duration of the received frame and the current NAV timer can be a NAV timer most recently updated by an OBSS. The OBSS NAV difference value may simply be referred to as a NAV difference value.

The STA can check whether the OBSS NAV is valid using the stored NAV difference value when the STA resets the current NAV (e.g., receives a CF-END frame) or attempts frame transmission irrespective of the current NAV (e.g., transmits a UL frame on the basis of a trigger frame).

For example, the STA can calculate {current NAV timer−OBSS NAV difference value} at the corresponding time to check whether the OBSS NAV is valid. For example, the STA determines the OBSS NAV to be valid when {current NAV timer−NAV difference value} exceeds an effective OBSS NAV threshold value (which has a default value of 0 but can be set to a value greater than 0). If {current NAV timer−NAV difference value} is equal to or less than 0, the STA may not maintain the OBSS NAV difference value or may set the OBSS NAV different value to 0. When the NAV difference value is not present or is set to 0, this can indicate that the OBSS NAV is not valid and thus the STA may not consider the OBSS NAV.

When the OBSS NAV is valid, the STA can operate in consideration of the OBSS NAV. For example, the STA may not reset the NAV at NAV reset timing or may not transmit a frame at frame transmission timing when the OBSS NAV is valid.

The STA considering the NAV may mean that the STA does not attempt frame transmission on the assumption that channels are busy or that the STA does not reset the OBSS NAV.

Figure 30:
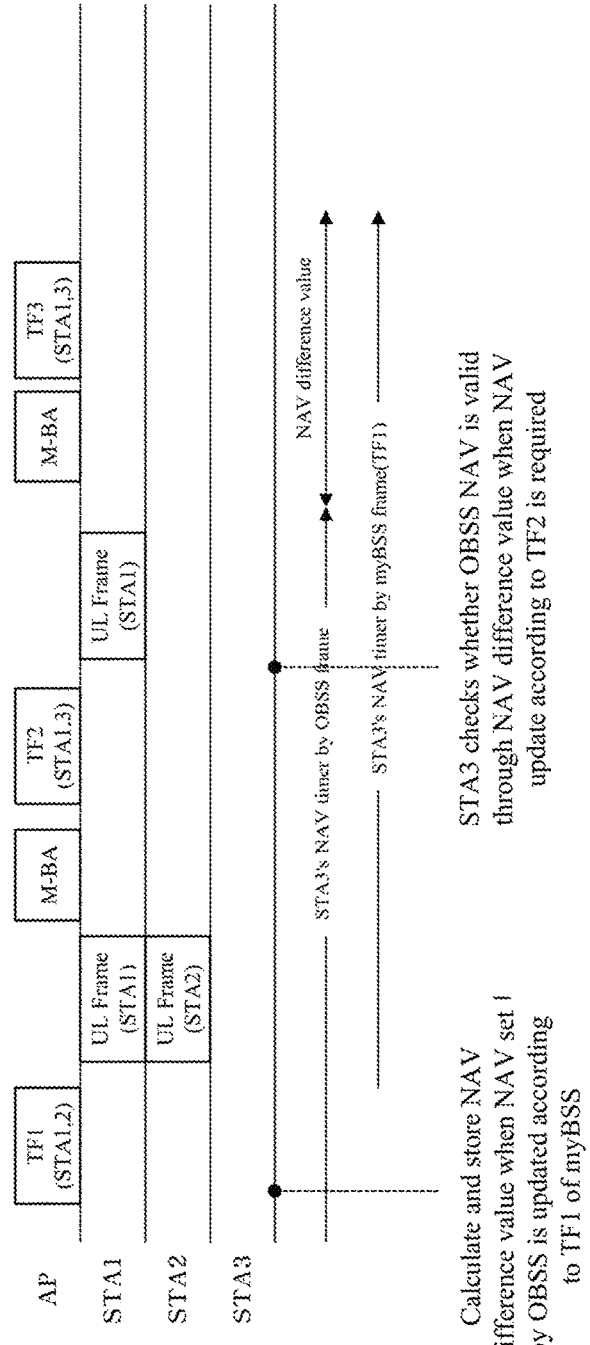
FIG. 30 illustrates NAV management according to another embodiment of the present invention.

FIG. 30 illustrates a NAV management method according to an embodiment of the present invention.

It is assumed that STA 3 maintains a NAV set according to an OBSS.

STA 3 receives TF 1 from an AP of myBSS. Here, it is assumed that a NAV of TF 1 exceeds the current NAV. STA 3 updates the NAV on the basis of TF 1. At this time, STA 3 calculates and stores a NAV difference value {NAV timer of TF 1−current NAV timer}.

Then, STA 3 receives TF 2. TF 3 includes scheduling information of STA3. STA 3 additionally checks whether the OBSS NAV is valid before attempting UL transmission based on TF 2. STA 3 may not consider the current NAV because the current NAV of STA 3 is set by an intra-BSS STA.

If {current NAV timer−NAV difference value} exceeds an effective OBSS NAV threshold value, STA3 can consider the OBSS NAV to be valid. STA 3 does not transmit a UL frame while the OBSS NAV is valid.

Meanwhile, the STA can calculate and store the NAV difference value even when the NAV set by myBSS (or intra-BSS) is updated by an OBSS (or inter-BSS), as described above with reference to FIG. 28. For example, when the NAV is updated (e.g., reset/canceled) according to an inter-BSS frame, the STA checks whether myBSS NAV is valid. When MyBSS NAV is valid, the STA can operate in consideration of MyBSS NAV. The method of calculating the NAV difference value and checking validity correspond to the above-described method and thus description thereof is omitted.

(3) NAV Management Example 6-3: CF-END Frame

A description will be given of a NAV update method when a CF-END frame for TXOP truncation is received.

When the current NAV has been updated according to an intra-BSS frame and an OBSS NAV is valid, the STA can update the current NAV to the OBSS NAV upon reception of a CF-END frame from the intra-BSS STA.

If the STA additionally maintains the OBSS NAV timer as in NAV management example 6-1, the STA can check whether the OBSS NAV is valid by additionally checking an OBSS NAV timer value. When the OBSS NAV is valid, the STA sets the current NAV to the OBSS NAV timer value.

When the STA has calculated and stored an OBSS NAV value as in NAV management example 6-2, the STA can recognize whether the OBSS NAV is valid using the OBSS NAV difference value. If the OBSS NAV is valid, the STA can set the current NAV to the OBSS NAV using the OBSS NAV difference value. As described in NAV management example 6-2, the STA can calculate the OBSS NAV difference value {NAV timer of the received frame−current NAV timer} when the current NAV is updated according to an OBSS frame. The STA can determine that the OBSS NAV to be valid when {current NAV timer−OBSS NAV difference value} exceeds an effective OBSS NAV threshold value at OBSS NAV validity check timing and update the current NAV to the OBSS NAV (=current NAV timer−OBSS NAV difference value).

(4) NAV Management Example 6-4: NAV Update Indicator

According to an embodiment of the present invention, depending on whether the current NAV has been updated from a previous NAV value or is newly set, the STA can consider or reset the NAV.

For example, whether to reset the NAV can be determined depending on whether a NAV immediately before the current NAV is zero or non-zero. The STA can store information (e.g., a NAV update indicator) about a previous NAV when setting or updating the NAV. For example, the NAV update indicator is set to 1 when the NAV is updated from a non-zero value and set to 0 when the NAV is initially set to zero.

When the STA receives a trigger frame from an AP thereof and transmits a ULL MU frame, the STA checks the NAV update indicator if the current NAV has been set according to a frame transmitted from an intra-BSS STA. When the NAV update indicator is 0, the STA determines that the current NAV has been newly set (e.g., initially set from NAV=0) and does not consider the set NAV (e.g., transmits a UL frame). If the NAV update indicator is 1, the STA can determine that the current NAV has been updated from a non-zero value and consider the set NAV (e.g., does not transmit a UL frame until the NAV expires).

If the current NAV has been set according to the intra BSS frame when the STA receives a CF-END frame from the intra-BSS STA (e.g., AP), the STA checks the NAV update indicator. When the NAV update indicator is 0, the STA can determine that the current NAV has been initially set and reset the NAV. If the NAV update indicator is 1, the STA determines that the current NAV has been updated from a non-zero value and may not reset the NAV.

When an STA (e.g., third party) that has received an RTS or MU-RTS frame cannot receive a frame (e.g., CTS) within a designated time, the STA can check the NAV update indicator. When the NAV update indicator is 0, the STA can determine that the current NAV has been initially set and reset the NAV. When the NAV update indicator is 1, the STA determines that the current NAV has been updated from a non-zero value and may not reset the set NAV.

(5) NAV Management Example 6-5: myBSS NAV Difference Value

The above-described methods can be used even when an intra-BSS (or myBSS) NAV is updated to an inter-BSS (or OBSS) NAV. In this case, a value calculated and stored by the STA can be referred to as an intra-BSS NAV difference value or myBSS NAV difference value instead of the NAV update indicator. However, the value is not limited thereto. Hereinafter, the value is referred to as myBSS NAV difference value for convenience.

When the STA maintaining an intra-BSS NAV (i.e., a NAV set/updated in response to reception of an intra-BSS frame) receives an inter-BSS frame and updates the NAV, the STA calculates the myBSS NAV difference value. The myBSS NAV difference value can be calculated through a method similar to the above-described OBSS NAV difference value calculation method. For example, myBSS NAV difference value can be calculated according to {NAV value calculated according to the currently received OBSS frame−current NAV value (e.g., myBSS NAV value)}. MyBSS NAV changes to an OBSS NAV according to NAV update. The STA can check whether myBSS NAV is valid using the stored myBSS NAV difference value. For example, when the OBSS NAV needs to be reset according to a frame (e.g., CF-END frame) transmitted from an OBSS STA, the STA can check whether myBSS NAV is valid. If myBSS NAV is valid, the STA updates the current NAV (e.g., OBSS NAV) to myBSS NAV.

Furthermore, the STA can determine that validity of myBSS NAV needs to be checked when the myBSS NAV difference value exceeds a specific threshold value (e.g., a default value is 0).

When checking whether myBSS NAV is valid, the STA can consider myBSS NAV to be valid if {current NAV value−myBSS NAV difference value} exceeds the specific threshold value (e.g., a default value is 0).

Here, myBSS NAV may correspond to {current NAV value−myBSS NAV difference value}.

Summary of NAV Management Examples

As described above, when the STA receives a CF-END frame from an OBSS STA, the STA needs to check whether the current NAV (e.g., most recent NAV update/setting) has been set according to an intra-BSS frame. When the most recent NAV update has been caused by the intra-BSS frame, the STA does not reset the NAV on the basis of the CF-END frame from the OBSS (e.g., protects the intra-BSS NAV).

In addition, it is necessary to protect an inter-BSS NAV as well as the intra-BSS NAV. For example, the STA needs to check whether the current NAV (e.g., most recent NAV update/setting) has been set according to an inter-BSS frame upon reception of a CF-END frame form an intra-BSS STA. If most recent NAV update has been caused by the inter-BSS frame, the STA may not reset the NAV on the basis of the CF-END frame from myBSS (e.g., protects the inter-BSS NAV).

Furthermore, when a NAV set by an OBSS is updated according to an intra-BSS frame, TXOP truncation according to the intra-BSS frame needs to be considered. A description will be given of a TXOP truncation method using an intra-BSS frame and/or methods available for UL MU frame responses (e.g., transmission based on a trigger frame) on the basis of the above-described discussions.

Figure 31:
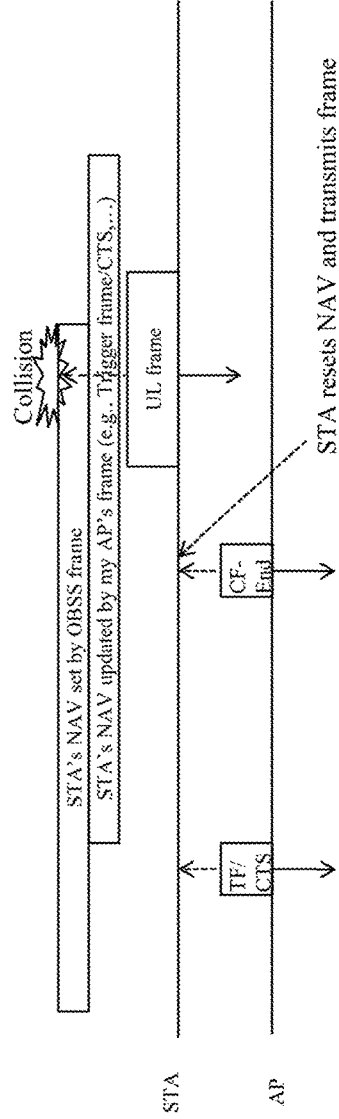
FIG. 31 illustrates TXOP truncation according to intra-BBS frame.

FIG. 31 illustrates TXOP truncation according to an intra-BSS frame. It is assumed that a NAV of an STA has been set by an OBSS. The STA updates the NAV upon reception of a frame (e.g., TF, CTS or the like) from an AP thereof. Then, the STA resets the NAV when the AP transmits a CF-END frame. When the STA transmits a UL frame after resetting the NAV, a NAV of the OBSS cannot be protected.

Figure 32:
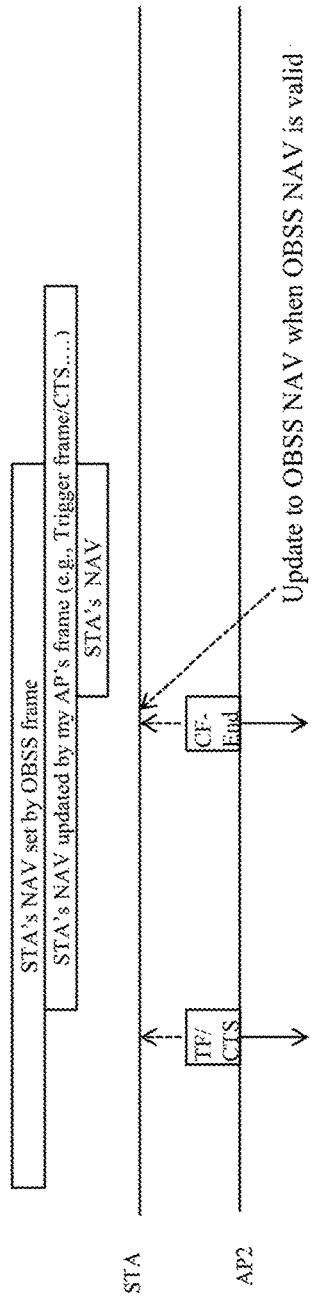
FIG. 32 illustrates NAV management according to another embodiment of the present invention.

FIG. 32 illustrates a NAV management method according to an embodiment of the present invention to solve the problem described with reference to FIG. 31. Description of parts corresponding to FIG. 31 is omitted.

Referring to FIG. 32, when an STA receives a CF-END frame from an AP thereof, the STA needs to determine whether an OBSS NAV is valid before resetting a NAV. If the OBSS NAV is valid, the STA may not reset the NAV. For example, the STA can update (e.g., restore) the current NAV to the OBSS NAV if the OBSS NAV is valid.

Figure 33:
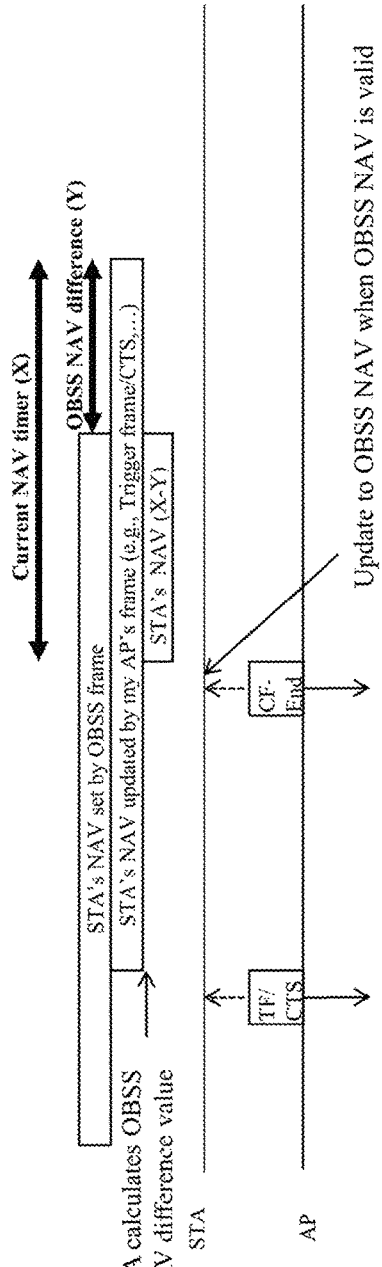
FIG. 33 illustrates a NAV difference value according to an embodiment of the present invention.

FIG. 33 is an explanatory diagram of a NAV difference value.

When an OBSS NAV is updated according to an intra-BSS frame, an STA can calculate and store a NAV difference value. The NAV difference value may be {NAV value according to the received frame (e.g., intra-BSS frame)−current NAV value}.

Then, the STA receives a CF-END frame from an AP thereof. The STA checks whether the OBSS NAV is valid before resetting the NAV. Validity of the OBSS NAV can be determined on the basis of the NAV difference value. For example, when {current (e.g., OBSS NAV validity check timing) NAV value X−NAV difference value Y} exceeds 0, the STA can determine that the OBSS NAV is valid. For example, if remaining time of the OBSS NAV is present on the assumption that NAV update according to the intra-BSS frame has not been performed, the STA can determine that the OBSS NAV is still valid.

If the OBSS NAV is valid, the STA can update the current NAV to the valid OBSS NAV value (e.g., a case in which myBSS NAV need not be protected due to reception of the CF-END frame). NAV update through an OBSS NAV value can be understood as restoration of the OBSS NAV value that would have continued if NAV update had not been updated according to the intra-BSS frame.

If the OBSS NAV is not valid, the STA can reset the NAV (e.g., a case in which both the OBSS NAV and myBSS NAV need not be protected).

Figure 34:
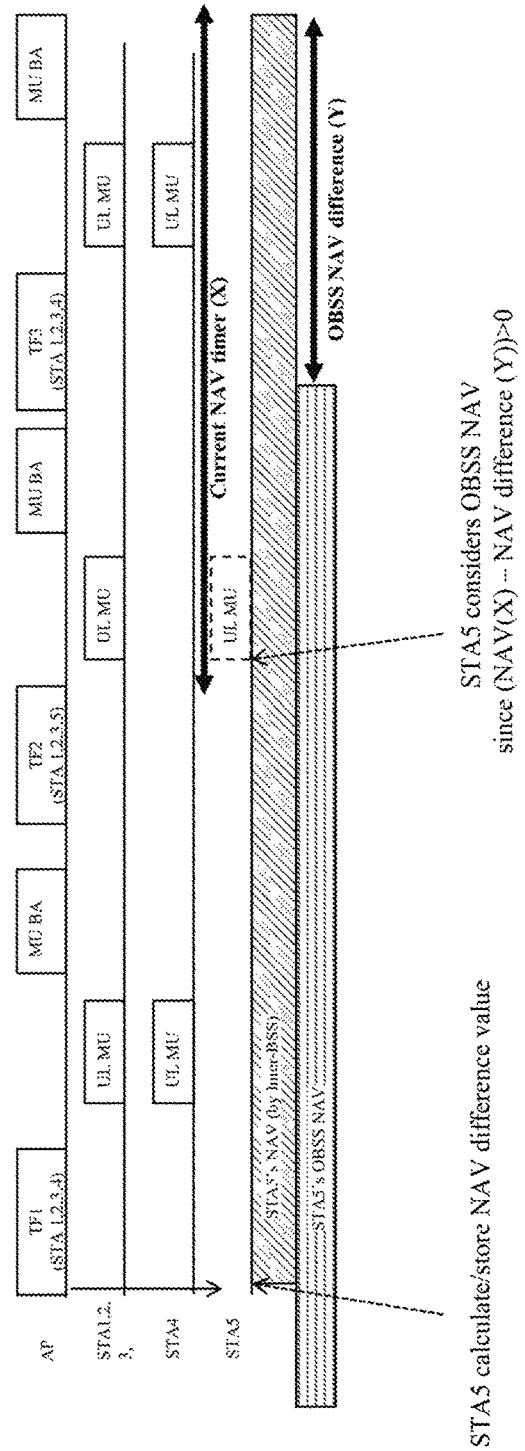
FIG. 34 illustrates NAV management according to another embodiment of the present invention.

FIG. 34 is an explanatory diagram of NAV update according to an embodiment of the present invention. It is assumed that an OBSS NAV has been set to STA 5.

STA 5 calculates and stores a NAV difference value when updating the NAV (e.g., OBSS NAV) through TF 1 (e.g., intra BSS frame).

STA 5 receives TF 2. It is assumed that there is no NAV update according to TF 2 and TF 2 includes resource allocation information about STA 5.

STA 5 checks whether the OBSS NAV is valid using the NAV difference value prior to UL frame transmission based on TF 2. For example, when {current (e.g., OBSS NAV check timing) NAV value−NAV difference value} exceeds 0, STA 5 can assume that the OBSS NAV is valid.

While the OBSS NAV is valid, STA 5 does not perform UL frame transmission based on TF 2 (e.g., considers the OBSSS NAV).

(i) Management of Multiple NAVs Using One NAV Timer

An STA can manage a plurality of NAVs (e.g., 2 NAVs) through a single NAV timer. The plurality of NAVs can include an intra-BSS NAV and a non-intra-BSS NAV. The intra-BSS NAV may be a NAV updated according to an intra-BSS frame. The non-intra-BSS NAV may be a NAV updated according to a frame other than the intra-BSS frame or a frame that cannot be determined as an intra-BSS frame (e.g., an inter-BSS frame or a frame that cannot be identified as an inter-BSS frame or an intra-BSS frame, such as CTS/ACK). The non-intra-BSS NAV may be referred to as a regular NAV.

When the current NAV (e.g., the single NAV timer) has been set according to an intra-BSS NAV and is updated according to a frame other than the intra-BSS frame (or in a reverse case), the STA can calculate and store a NAV difference value. The NAV difference value may be {NAV value according to the received frame−intra-BSS NAV} or {NAV value according to the received frame−inter-BSS NAV}.

Then, the STA can update the NAV thereof (e.g., the single NAV timer) through the duration of the inter-BSS frame. Accordingly, the current NAV of the STA can be regarded as an inter-BSS NAV.

When the NAV difference value is 0, the two NAVs may be invalid or only the current NAV may be valid.

If it is necessary to check the NAVs (e.g., before transmitting a UL MU frame or resetting the NAV), the STA can check whether the two NAVs are valid. For example, if both the NAVs are not 0, the two NAVs are determined to be valid. An NAV having a value of 0 is determined to be invalid. The NAV difference value may be used to determine validity of the two NAVs. For example, when {current NAV value (e.g., single NAV timer)−NAV difference value} exceeds 0, the two NAVs are determined to be valid (e.g., since the current NAV value is also not 0). However, if {current NAV value−NAV difference value} is not greater than 0, only one (e.g., intra-BSS NAV or inter-BSS NAV) of the NAVs is determined to be valid.

If both the NAVs are valid, the STA operates in consideration of both the NAVs. When only the current NAV (e.g., intra-BSS NAV or inter-BSS NAV) is valid, the STA can operate in consideration of only the current NAV.

Assume that the current NAV (e.g., the single NAV timer) is the intra-BSS NAV and the STA receives a CF-END frame from the intra-BSS STA. If the two NAVs are valid, the STA updates the current NAV (e.g., the single NAV timer) to the non-intra-BSS NAV (e.g., current NAV value−NAV difference value). When both the NAVs are not valid, the STA resets the current NAV (e.g., the single NAV timer) on the basis of the CF-END frame.

Assume that the current NAV (e.g., the single NAV timer) is the intra-BSS NAV and the STA receives a CF-END frame from the inter-BSS STA. If the two NAVs are valid, the STA does not reset the current NAV (e.g., the single NAV timer) corresponding to the intra-BSS NAV. However, the STA may reset the non-intra-BSS NAV. Resetting the non-intra-BSS NAV may mean setting the NAV difference value to 0.

Assume that the current NAV (e.g., the single NAV timer) is the non-intra BSS NAV and the STA receives a CF-END frame from the inter-BSS STA. If the two NAVs are valid, the STA updates the current NAV (e.g., the single NAV timer) corresponding to the non-intra-BSS NAV to the intra-BSS NAV (e.g., current NAV value−NAV difference value). When both the NAVs are not valid, the STA resets the current NAV (e.g., the single NAV timer) on the basis of the CF-END frame.

Assume that the current NAV (e.g., the single NAV timer) is the non-intra-BSS NAV and the STA receives a CF-END frame from the intra-BSS STA. If the two NAVs are valid, the STA does not reset the current NAV (e.g., the single NAV timer) corresponding to the non-intra-BSS NAV. However, the STA may reset the intra NAV. Resetting the intra-BSS NAV may mean setting the NAV difference value to 0.

(ii) Management of Multiple NAVs Using Multiple NAV Timers

As described above, the STA can consider NAVs in transmission of UL MU frames and particularly, the STA can manage a plurality of NAVs (e.g., intra-BSS NAV and a non-intra-BSS NAV). To manage the plurality of NAVs, the STA may set a plurality of NAV timers instead of the method of setting a single NAV timer (e.g., using a NAV difference value). For example, separate NAV timers can be respectively set for the intra-BSS NAV and the non-intra-BSS NAV.

For example, an intra BSS NAV timer may be a NAV timer updated according to an intra BSS frame/PPDU and a non-intra-BSS NAV timer may be a NAV timer updated according to a frame that is not an intra-BSS frame or a frame that cannot be identified as an intra-BSS frame or an inter-BSS frame.

The STA needs to consider the non-intra-BSS NAV timer prior to transmission of a UL MU frame in response to a trigger frame.

In addition, the STA can reset the intra-BSS NAV upon reception of a CF-END frame from an intra-BSS and reset the non-intra-BSS NAV upon reception of a CF-END frame from an inter-BSS.

Figure 35:
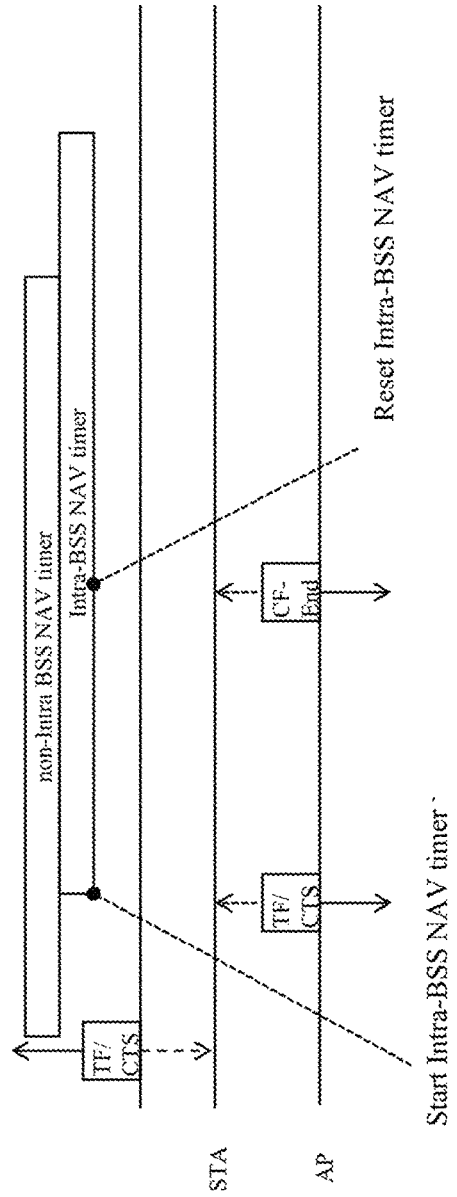
FIG. 35 illustrates 2 NAV timers according to an embodiment of the present invention.

FIG. 35 illustrates two NAV timers according to an embodiment of the present invention.

Referring to FIG. 35, an STA receives a TF or a CTS frame from an OBSS STA and sets a non-intra-BSS NAV timer.

The STA receives a TF or a CTS frame from an AP thereof and starts an intra-BSS NAV timer. The STA resets the intra-BSS NAV timer upon reception of a CF-END frame from the AP thereof.

In an embodiment of managing two NAVs through a single NAV timer, the STA can calculate and store a NAV difference value whenever the current NAV timer value changes from one NAV to the other NAV.

In an embodiment of managing two NAVs through two NAV timers, the STA needs to consider the non-intra-BSS NAV prior to UL MU frame transmission and resets the corresponding NAV timer upon reception of a CF-END frame.

Figure 36:
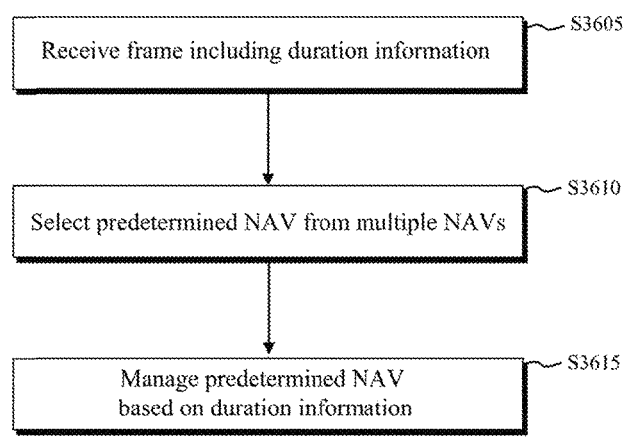
FIG. 36 is a flowchart illustrating a NAV management method according to an embodiment of the present invention.

FIG. 36 illustrates a NAV management method according to an embodiment of the present invention. Description of parts corresponding to the above description is omitted.

Referring to FIG. 36, an STA receives a frame including duration information (S3605). The duration information may be a TXOP duration value indicated by a TXOP duration field included in an HE-SIG A field or a MAC duration value indicated by a duration field included in a MAC header. However, the duration information is not limited thereto.

For example, the frame may be a control frame such as RTS, CTS or the like, a management frame, a trigger frame, an HE-PPDU based frame or a non-HE PPDU based frame. However, the frame is not limited thereto.

The STA selects a predetermined NAV from a plurality of NAVs (S3610).

For example, the STA may have the plurality of NAVs. The plurality of NAVs may include an intra-BSS NAV and a non-intra-BSS NAV. The non-intra-BSS NAV may be for an OBSS (other BSS) frame. In addition, the non-intra-BSS NAV may be for a frame through which BSS cannot be identified. For example, the frame through which BSS cannot be identified may be a frame having no BSSID information in a RA field or a TA field (e.g., ACK, CTS, etc.).

The predetermined NAV may be selected on the basis of whether the corresponding frame has been received from a BSS (basic service set) to which the STA belongs. For example, the STA can determine whether the frame has been received from MyBSS.

The STA can select a first NAV (e.g., intra-BSS NAV) upon determining that the frame has been received from the BSS to which the STA belongs and select a second NAV (e.g., non-intra-BSS NAV) upon determining that the frame has been received from a BSS to which the STA does not belong. Additionally, the STA can also select the second NAV (e.g., non-intra-BSS NAV) when the STA cannot determine a BSS from which the frame has been received.

The STA can manage the predetermined NAV on the basis of the duration information of the frame (S3615). NAV management may be one of NAV initial setting, NAV update and NAV resetting. However, NAV management is not limited thereto.

When any of the plurality of NAVs has a value greater than 0, the STA can defer channel access.

According to an embodiment, the STA can set a plurality of NAV timers corresponding to the plurality of NAVs.

According to another embodiment, the STA may set only one NAV timer. For example, the plurality of NAVs can be managed using a difference value between NAVs and a single NAV timer. When the value of the single NAV timer changes from the first NAV to the second NAV or changes from the second NAV to the first NAV, the NAV difference value can be updated. In addition, the STA may check validity of one NAV using the current value of another NAV mapped to the single NAV timer and the NAV difference value.

Figure 37:
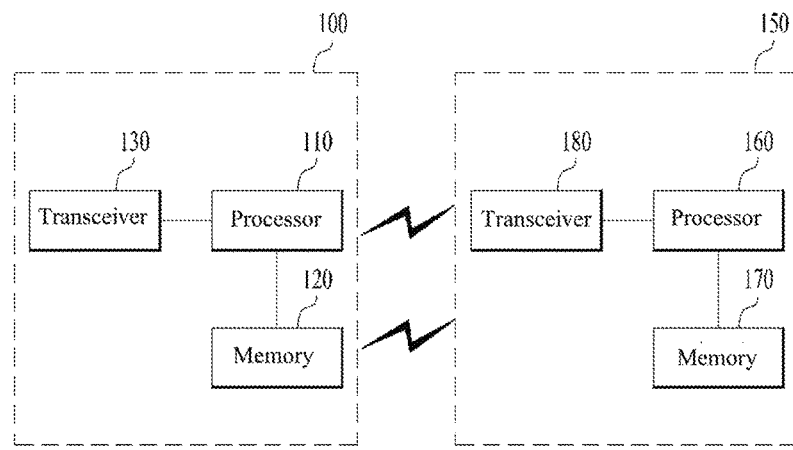
FIG. 37 illustrates devices according to an embodiment of the present invention.

FIG. 37 illustrates devices for implementing the aforementioned methods.

A wireless device 100 and a wireless device 150 in FIG. 37 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

What is claimed is:

1. A method of updating a network allocation vector (NAV) timer by a station (STA) in a wireless local area network (LAN) system supporting transmission of a high efficiency physical layer protocol data unit (HE PPDU), the method comprising:
   receiving, by the STA, a frame including a signal (SIG) field, wherein the SIG field includes a transmission opportunity (TXOP) duration subfield;
   obtaining a TXOP duration value from the TXOP duration subfield of the SIG field;
   selecting, by the STA, a NAV timer from a first NAV timer for an intra-basic service set (intra-BSS) frame and a second NAV timer for an overlapping BSS (OBSS) frame, based on whether or not the frame is the intra-BSS frame; and
   updating, by the STA, the selected NAV timer based on the TXOP duration value,
   wherein the obtaining the TXOP duration value comprises:
      determining a scaling factor for the TXOP duration value based on a first part of the TXOP duration subfield;
      determining a scaled duration value based on a second part of the TXOP duration subfield; and
      determining the TXOP duration value based on the scaling factor and the scaled duration value,
   wherein the frame includes a medium access control (MAC) header, and the MAC header includes a duration field for the frame,
   wherein a granularity used for the duration field is 1 us, and
   wherein a total number of the plurality of bits in the TXOP duration subfield is smaller than that of the duration field.

2. The method of claim 1, wherein the selecting of the NAV timer comprises:
   selecting the first NAV timer upon determining that the frame is the intra-BSS frame received from a BSS to which the STA belongs; and
   selecting the second NAV timer upon determining that the frame is the OBSS frame received from a BSS to which the STA does not belong.

3. The method of claim 1, wherein the second NAV timer is used for a frame through which a BSS cannot be identified.

4. The method of claim 3, wherein the frame through which the BSS cannot be identified is an acknowledgement (ACK) frame or a clear-to-send (CTS) frame.

5. The method of claim 1, wherein the STA defers channel access when any of the first NAV timer and the second NAV timer has a value greater than 0.

6. A station (STA) for updating a network allocation vector (NAV) timer in a wireless local area network (LAN) system supporting transmission of a high efficiency physical layer protocol data unit (HE PPDU), the STA comprising:
   a receiver for receiving a frame including a signal (SIG) field, wherein the SIG field includes a transmission opportunity (TXOP) duration subfield; and
   a processor for:
      obtaining a TXOP duration value from the TXOP duration subfield of the SIG field,
      selecting a NAV timer from a first NAV timer for an intra-basic service set (intra-BSS) frame and a second NAV timer for an overlapping BSS (OBSS) frame, based on whether or not the frame is the intra-BSS frame, and
      updating the selected NAV timer based on the TXOP duration value,
   wherein the processor obtains the TXOP duration value by:
      determining a scaling factor for the TXOP duration value based on a first part of the TXOP duration subfield,
      determining a scaled duration value based on a second part of the TXOP duration subfield, and
      determining the TXOP duration value based on the scaling factor and the scaled duration value,
   wherein the frame includes a medium access control (MAC) header, and the MAC header includes a duration field for the frame,
   wherein a granularity used for the duration field is 1 us, and
   wherein a total number of the plurality of bits in the TXOP duration subfield is smaller than that of the duration field.

7. The STA of claim 6, wherein the processor selects the first NAV upon determining that the frame is the intra-BSS frame received from a BSS to which the STA belongs, and selects the second NAV upon determining that the frame is the OBSS frame received from a BSS to which the STA does not belong.

8. The STA of claim 6, wherein the second NAV timer is used for a frame through which a BSS cannot be identified.

9. The method of claim 1, wherein a granularity determined based on the scaling factor is larger than the granularity used for the duration field.

10. The STA of claim 6, wherein a granularity determined based on the scaling factor is larger than the granularity used for the duration field.

* * * * *